(12) United States Patent
Terauchi

(10) Patent No.: US 8,017,211 B2
(45) Date of Patent: Sep. 13, 2011

(54) COMPOSITION, CURED PRODUCT AND ARTICLE

(75) Inventor: Makoto Terauchi, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 836 days.

(21) Appl. No.: 11/720,809

(22) PCT Filed: Dec. 2, 2005

(86) PCT No.: PCT/JP2005/022150
§ 371 (c)(1),
(2), (4) Date: Nov. 19, 2007

(87) PCT Pub. No.: WO2006/059702
PCT Pub. Date: Jun. 8, 2006

(65) Prior Publication Data
US 2010/0129587 A1    May 27, 2010

(30) Foreign Application Priority Data
Dec. 3, 2004    (JP) ................................ 2004-350658

(51) Int. Cl.
*B32B 3/02*    (2006.01)
*C08G 77/42*    (2006.01)

(52) U.S. Cl. ...... 428/64.4; 428/65.1; 428/413; 428/421; 428/447; 428/500; 522/100; 522/102; 522/103; 522/148; 525/474; 525/479; 528/30

(58) Field of Classification Search .................. 428/64.4, 428/65.1, 413, 421, 447, 500; 522/103, 172, 522/100, 102, 111, 148, 149; 528/25, 26, 528/30, 27; 525/474, 479
See application file for complete search history.

(56) References Cited

U.S. PATENT DOCUMENTS 4,761,459 A * 8/1988 Matsuo et al. ................ 525/479
5,609,990 A * 3/1997 Ha et al. .................. 430/270.11

FOREIGN PATENT DOCUMENTS

| JP | 62 285970 | 12/1987 |
|---|---|---|
| JP | 11 189622 | 7/1999 |
| JP | 2939309 | 8/1999 |
| JP | 11-293159 | 10/1999 |
| JP | 2002-30150 | 1/2002 |
| JP | 2002-234906 | 8/2002 |
| JP | 2003 277478 | 10/2003 |
| JP | 2002 332313 | 11/2003 |
| JP | 2004 152418 | 5/2004 |
| JP | 2004-359834 | 12/2004 |
| JP | 2005-126453 | 5/2005 |

* cited by examiner

*Primary Examiner* — Mark Ruthkosky
*Assistant Examiner* — Gerard T Higgins
(74) *Attorney, Agent, or Firm* — Oblon, Spivak, McClelland, Maier & Neustadt, L.L.P.

(57) ABSTRACT

A composition, etc. are provided, which can enhance hardness and afford abrasion resistance even in a thin film as well as excellent antifouling property and durability of the antifouling property.
An organic polymer, is provided, which comprises 5 to 30 weight percent of a radical polymerizable monomer having a perfluoroalkyl group, 0.01 to 5 weight percent of $\alpha,\omega$-dimercaptopolysiloxane, 5 to 40 weight percent of a radical polymerizable monomer having a cationic photo polymerizable epoxy group, and 25 to 75 weight percent of the other radical polymerizable monomer copolymerizable therewith, said organic polymer having a structure corresponding to a radical polymerizable copolymer of a mixture of the monomers in which a molar ratio of the mercapto group to the epoxy group is 0.0001 to 0.025, and/or a structure obtained by reacting the epoxy groups of the radical polymerizable copolymer with (meth) acrylic acid.

21 Claims, No Drawings

COMPOSITION, CURED PRODUCT AND ARTICLE

TECHNICAL FIELD

The present invention relates to a novel organic polymer, a composition containing said organic polymer, having excellent hardness and scratching resistance, and being usable as an antifouling agent as well as cured products and articles using said composition. In particular, the invention relates to the composition which produces coated films having sufficient performance even in thin film thickness.

BACKGROUND OF THE INVENTION

Owing to their lightweights, easy processability, impact resistance, etc., the plastic products are used in various applications including containers, automobile instrument panels and outer plates, window materials, roof materials, wrapping materials, various housing materials, optical disc substrates, plastic lenses, base materials in display devices such as liquid crystal displays, plasma displays, projection TVs, etc.

Among them, for examples, resin materials such as polycarbonates, polymethyl methacrylate, polyethylene terephthalate, polybutylene terephthalate, styrene-based resins including acrylonitrile-butadiene-styrene copolymer (ABS), methyl methacrylate-styrene copolymer (MS resin), acrylonitrile styrene copolymer (AS resin) etc., vinyl chloride-based resins, cellulose acetate including triacetyl cellulose are suitable for the above applications, because they are excellent particularly in lightweights, easy processability, impact resistances, etc.

However, these plastic products are easily damaged due to low surface hardness. Transparent resins such as a polycarbonate and polyethylene terephthalate have a defect that their inherent transparency or appearance is conspicuously damaged. Thus, this makes it difficult for the plastic products to be used in fields requiring abrasion resistance.

Under the circumstances, active energy ray-curable hard coat materials (coating materials) giving abrasion resistance to the surfaces of the plastic products have been sought. However, since cured layers of commercially available, active energy ray-curable hard coat materials are largely shrunk to cause warping, peeling off or cracking, it is difficult to coat them thick. Consequently, there was a limit on the attainable hardness and scratching resistance.

In order to solve such problems, various active energy ray-curable coating materials have been recently proposed, which would realize hardness and abrasion resistance that exceed those in the conventional methods. For example, JP-A 11-309814 discloses that abrasion resistance is largely improved by coating two or more layers of coating agents, while using an inorganic coating agent having a coated film formability, such as polysilaxane, for the outermost layer. However, since the coating agent is inorganic, it is difficult to form a thick film. Thus, since it is substantially necessary to apply two or more layers, there is a problem of poor processability.

On the other hand, a trial is made, in which hardness and abrasion resistance are improved by coating two or more layers of coating agents having different coefficients of elasticity. For example, JP-A 2000-52472 describes that a coated film having high hardness is obtained by making the coefficient of elasticity of a first layer of a coating agent larger than that of a second layer of another coating agent. U.S. Pat. No. 6,489,015 (JP-A 2000-214791) also describes that a coated film having hardness is obtained by setting the coefficient of elasticity of a first layer coating agent larger than that of a second layer of another coating agent. However, in any of them, the total thickness of the coated film becomes at least 10 μm, and processability is poor in that two or more layers are applied.

Furthermore, U.S. Pat. No. 6,846,567 (JP-A 2000-219845) describes that excellent abrasion resistance can be realized, while the total thickness of coated films is set to at most 10 μm, when a methacrylic polymer is applied as a first layer, and on the first layer, as a second layer, a coated film, which is obtained by curing an organosiloxane resin comprising a hydrolysis condensate of colloidal silica and a specific silicate, is laminated. However, there is no change the application of two or more layers.

Meanwhile, coating agents capable of realizing excellent hardness and abrasion resistance even if applied in a single layer have been investigated. Heretofore, compositions of colloidal silica and multifunctional acrylates, hydrolysis condensate compositions of colloidal silica and a specific silicate, and curable resin compositions of the above and a polyfunctional acrylate, an epoxy resin, a phenoxy resin or the like, or compositions of the above compositions and an acryl resin, etc. have been widely investigated as organic-inorganic composite coating agents. However, they had problems of insufficient-hardness and abrasion resistance, poor stability in the form of a coating liquid, or insufficient environmental properties (moisture resistance, heat resistance, etc.) of cured films, etc. As compared with them, an active energy ray-curable coating agent including a compound obtained by reacting a polyfunctional acrylate with a colloidal silica as disclosed in U.S. Pat. No. 5,378,735 (JP-A 5-287215) and U.S. Pat. No. 6,160,067 (JP-A 9-100111) has more excellent hardness and abrasion resistance, even if coated in a single layer, than the conventional organic-inorganic composite coating agents. However, since they had low antifouling property and weatherability, and further sufficient surface curing cannot be realized when they are applied in the form of a thin film, it was difficult to realize the physical properties that should essentially appear.

Further, for example, as shown in JP-A 10-316864, a method for using a polymerized UV curable resin is proposed to decrease shrinkage. However, although shrinkage is largely reduced on curing, it has a limit in the case that it is adopted in applications requiring further reduction in shrinkage or applications requiring higher hardness and scratching resistance, in addition, the resin is susceptible to interruption on curing with oxygen, and particularly has a problem in curing a thin film (for example, film thickness: at most 2 μm). Furthermore, since a cured degree in a surface portion is low even in the case that the film is not thin, there are many problems in the durability of the physical properties.

Moreover, in order to further lower the shrinkage or improve the cured degree of the surface, there are proposed a method using a cationic polymerizable resin as a (polymerized) UV curable resin (JP-A 2001-40205, etc.), and a method using a colloidal silica to which a cationic polymerizable low molecular-weight organic component is suggested (JP-A 2002-53659, etc.), and a method using these components and an ordinary radical polymerizable UV curable resin (including both organic and organic-inorganic hybrid resins) in combination (For example, JP-A 9-278935, JP-A 2002-128887, JP-A 2002-322430, U.S. Pat. No. 6,777,102 (JP-A 2003-147017, etc.). Although they have the characteristics of reduced shrinkage, increased film thickness or enhanced surface curing, there is still a limit in application to usages requiring further increased hardness and scratching resistance. Further, there are still many problems in affording antifouling property and weatherability.

Meanwhile, there are many examples regarding antifouling coating agents (For example, coating films obtained from a specific fluorine-containing polymer or a silicone-containing polymer (JP-A 61-275365, JP-A 10-279834, JP-A 2002-37827, JP-A 2002-241146, JP-A 2003-165928, JP-A 2003-313385, etc.). However, they had a problem in durability of the performance, particularly the durability of the antifouling property, especially when the scratching resistance was poor.

As a method for solving such problems, the present inventors have investigated various active energy ray-curable compositions each containing a copolymer, as an essential component, which copolymer contains acryl groups and polysiloxane groups in side chains and further contains fluorine-containing alkyl groups if needed (For example, JP-A 2000-80169, JP-A 2001-98188, JP-A 2002-194084, etc.). Further, JP-A 2003-335984 describes that an active energy ray-curable resin composition containing a copolymer which has fluorine or a polysiloxane and also contains acryl groups forms a cured film having an excellent balance among the antifouling property, high hardness and scratching resistance.

Although coated films obtained from these compositions had relatively good antifouling property and durability, the level required for the antifouling property has recently become high, and it has come to be not said that the performance is sufficient particularly in applications of recently developed next-generation type optical discs in which writing and erasing are performed with blue laser, touch panel displays for car navigators, PDA and cellular phones, large flat panel displays for liquid crystal TVs and plasma TVs, etc. This is because such antifouling copolymers themselves have relatively low hardness and their curing property is not high.

Since the composition was often applied in a thin film particularly in the case of such applications, there were many problems particularly in the durability the physical properties and the antifouling properties in such cases.

Further, in the case of the optical recording media such as optical discs, etc. and optical articles such as touch panels, etc. contamination with a stain of a fingerprint or a contaminant such as dust influences not only the appearance but also the performance. This results in increased writing/reading disorder, errors at the time of writing/reading, etc. particularly in the case of the optical recording media.

Recently, as the high density optical recording media, an optical disc is proposed in which the writing/reading beam size is decreased and the recording density per unit density is increased to a few times or more of that of the DVD through shortening the writing/reading wavelength to around 400 nm or increasing the numerical aperture (N/A) of an objective lens. For example, they are BLU-RAY DISC™ (high-density optical disc) and HD DVD.

As the writing/reading beam size decreases, the diameter of the beam on a surface at a beam-incident side also decreases. Therefore, the disc is sensitive to a stain on the surface of the medium, so that writing/reading disorders or errors are likely to occur. Further, a stain containing an organic substance like a fingerprint causes a problem that once it attaches, it is difficult to be removed.

As methods to solve such problems, for example, JP-A 10-110118 proposes that a non-crosslinking type fluorine-based surface active agent is added into a coated film of a hard coat on a surface of a disc substrate, and JP-A 11-293159 proposes that crosslinking type and non-crossing type fluorine-based surface active agents are simultaneously added thereinto. However, further improvement of the performance is needed.

US-A1 2004-013976 (JP-A 2002-245672) and JP-A 2002-234906 describe that an optical disc on which is formed a hard coat film composed of an organic-inorganic hybrid resin composition that contains a slipping agent of such as an acryl resin or modified silicone with an organopolysiloxane group have an excellent slipping property. However, they are mainly aimed at protecting a media placed in cartridges, but pay no attention to the stains of the fingerprints. Further, the slipping property and the fingerprint resistance (so-called antifouling property) are fundamentally different, and most of the slipping agents generally have insufficient fingerprint resistance (so-called antifouling property).

US-A1 2005-191410 (JP-A 2004-152418) and US-A1 2005-072336 (JP-A 2005-112900) describe that an optical recording medium having a layer of a specific hard coat which contains a silicone-based compound or a fluorine-based compound with active energy ray-curable groups exhibits excellent fingerprint resistance. However, although an attaching area of a fingerprint can be reduced because of excellent water-repellent and oil-repellent properties, it could not be said that a fingerprint wiping-off property and its durability are sufficient.

DISCLOSURE OF THE INVENTION

Problems to be Solved by the Invention

The present invention is to solve the above problems, and to provide a composition, etc. which can enhance hardness and afford abrasion resistance even in a thin film, as well as excellent antifouling property and durability of the antifouling property.

Further, the invention is to provide a composition, etc. which can afford weatherability if needed, while the above performances are maintained, and can afford excellent thin film and surface curability.

Countermeasures for Solving the Problems

Concentrating on a solution of the above-mentioned problems, the present inventors discovered that a composition retaining a structure corresponding to a specific copolymer having antifouling groups and cationic photo polymerizable groups are added or a structure in which the above cationic photo polymerizable groups are reacted with acrylic acid is extremely effective as an antifouling agent. Specifically, the objects can be accomplished by the following measures.

(1) An organic polymer, having a structure corresponding to a radical polymerizable copolymer obtained by using a mixture comprising 5 to 30 weight percent of a radical polymerizable monomer having a perfluoroalkyl group, 0.01 to 5 weight percent of $\alpha,\omega$-dimercaptopolysiloxane, 5 to 40 weight percent of a radical polymerizable monomer having a cationic photo polymerizable epoxy group, and 25 to 75 weight percent of the other radical polymerizable monomer copolymerizable therewith, in which the molar ratio of the mercapto groups to the epoxy groups is 0.0001 to 0.025; and/or a structure obtained by reacting the epoxy groups of the radical polymerizable copolymer with (meth)acrylic acid.

(2) The organic polymer according to (1), wherein the $\alpha,\omega$-dimercaptopolysiloxane is $\alpha,\omega$-dimercaptopolydimethylsiloxane.

(3) A composition containing the organic polymer according to (1) or (2), and further containing a cationic photo polymerization initiator and/or a radical photopolymerization initiator.

(4) The composition according to (3), further comprising an organic-inorganic composite having fine particles of an inorganic oxide consisting mainly of a colloidal silica, and (meth)acryloyl groups bonded to the inorganic oxide fine particles via —O—Si—R-bond, wherein R represents an linear or branched alkylene group having 2 to 10 carbon atoms, and/or a polyfunctional (meth)acrylate having at least three (meth)acryloyl groups in one molecule.

(5) The composition according to (3) or (4), further comprising at least one kind selected from the group consisting of a radical polymerizable organic (meth)acrylate compound, a radical polymerizable organic (meth)acrylamide, a polymer having a radical polymerizable group, an organic epoxy compound and an organic oxetane compound.

(6) The composition according to any one of (3) to (5), further comprising at least one kind selected from the group consisting of an ultraviolet absorber, a hindered amine light stabilizer, an antistatic agent, a slipping agent, an anti-clouding agent and a releasing agent.

(7) The composition according to any one of (3) to (6), further comprising an organic polymer having a structure corresponding to a copolymer obtained by using a mixture comprising a (meth)acrylate having a liner alkyl group having at least 12 carbon atoms and a (meth)acrylate having a cationic photo polymerizable epoxy group and/or a structure obtained by reacting (meth)acryl acid with the epoxy groups of the copolymer.

(8) The composition according to any one of (3) to (7), characterized in that when a coated film thickness of 5 µm is formed by applying the composition onto an adhesive polyethylene terephthalate substrate having a thickness of 100 µm, and polymerizing it by irradiation with active energy rays, the coated film has a pencil hardness of HB or more and a contact angle to water least 80 degrees.

(9) The composition according to any one of (3) to (7), characterized in that when a coated film thickness of 5 µm is formed by applying the composition onto an adhesive polyethylene terephthalate substrate having a thickness of 100 µm, and polymerizing it by irradiation with active energy rays, the coated film, has a pencil hardness of HB or more, a contact angle to water of at least 90 degrees, and a contact angle to hexadecane of at most 20 degrees.

(10) The composition according to any one of (3) to (9), characterized in that when a coated film thickness of 5 µm is formed by applying the composition onto an adhesive polyethylene terephthalate substrate having a thickness of 100 µm, and polymerizing it by irradiation with active energy rays, the coated film contains an antifouling groups at a position of a depth of 3 nm from the surface of the coated film in an amount at least three times of an average amount of the antifouling groups of the whole film.

(11) The composition according to any one of (3) to (10), characterized in that when a coated film thickness of 5 µm is formed by applying the composition onto an adhesive polyethylene terephthalate substrate having a thickness of 100 µm, and polymerizing it by irradiation with active energy rays, the coated film exhibits an abrasion resistance of at most 25.0 and a warped amount of at most 1 mm after being cured in an atmosphere with an ordinary oxygen concentration.

(12) The composition according to any one of (3) to (11), characterized in that when a coated film thickness of 5 µm is formed by applying the composition onto an adhesive polyethylene terephthalate substrate having a thickness of 100 µm, and polymerizing it by irradiation with active energy rays, the coated film has a haze value of at most 1.5%.

(13) An antifouling agent, comprising the composition according to any one of (3) to (12).

(14) A cured article obtained by polymerizing the composition according to any one of (3) to (13) by irradiation with active energy rays.

(15) An article having a coated film on a surface thereof, said film being obtained by polymerizing the composition according to any one of (3) to (13) by irradiation with active energy rays.

(16) The article according to (15), which is to be used for optical applications.

(17) The article according to (15), which is an optical recording medium or a laminate for an optical display.

(18) An optical recording medium having a multilayer film comprising at least a recording layer or a reflecting layer deposited on a substrate, wherein a cured film is deposited on an outermost surface at a radiation-incident side of the optical recording medium, and the cured film is obtained by polymerizing the composition according to any one (3) to (13) irradiation with active enemy rays.

(19) The optical recording medium according to (18), having the cured film on the outermost surface at an opposite side of the recording layer or the reflecting layer the substrate.

(20) The optical recording medium according to (19), having a transparent layer between the multilayer film and the cured film.

(21) The optical recording medium according (20), wherein the transparent layer contains fine particles of an inorganic oxide and/or an urethaneacrylate.

(22) A laminate for an optical display comprising a transparent resin substrate, wherein a cured film is deposited on at least one outermost surface of the laminate for an optical display, and the cured film is obtained by polymerizing the composition according to any one of (3) to (13) by irradiation with an active energy ray.

Effects of the Invention

The organic polymer according to the present invention has the cationic photo polymerizable groups, and the composition containing this organic polymer undergoes a cation polymerization when cured. For this reason, it was clarified that the composition is less susceptible to interruption with oxygen because of difference in polymerization terminating reaction, as compared with the radical polymerization. Thus, the hard coat thin film can be made. In addition, since the coat film exhibits lower shrinkage as compared with an addition polymerization of unsaturated bonds, the hard coat thick film can be made.

Further, the composition containing the polymer in which the cationic photo polymerizable groups are converted to the radical photo polymerizable groups through addition of the (meth)acrylic acid thereto is relatively less susceptible to interruption with oxygen on curing beyond expectation despite of the radical polymerization, and the coat film exhibits low shrinkage. Thus, the composition is still suitable for both thin film and thick film. Therefore, the present composition can be applied to applications in which the cationic photo polymerization initiator cannot be used. For example, although the cationic photo polymerization initiator generally generates an acid, the present composition has the advantage that no bad influence is exerted even when the composition is applied to and cured on an article, which is likely to be damaged with the acid, such as optical recording medium having a recording layer to be likely attacked with the acid.

Furthermore, even when the thin film is formed by thinly applying the composition according to the present invention to the surface of the article or the like and then curing it, the article or the like has excellent curability, scratching resistance, transparency and antifouling property. In addition, durability of these performances can be improved. Therefore, the optical article having such a cured film on the surface possesses the advantage that it has high hardness and abrasion resistance and excellent antifouling property and durability of the antifouling property.

For this reason, the article can be favorably used in applications in a wide area including surface protection of optical recording media, protections of transparent portions of touch panels, displays, cellular phone bodies and automobiles, protection of transparent portions of plastics for use in agricultural applications (greenhouses), etc. Since the hard coat film is highly required to be made thinner particularly with respect to various kinds of optical discs (DVDs, BLU-RAY™ discs, HD DVDs, etc.) such as ROM type optical discs, pigment type optical discs, phase changing type optical discs, photo-electro magnetic discs, etc., or transparent articles for optical displays such as touch panels, the present invention is suitably used for them.

On the other hand, when the composition according no the present invention is thickly applied to a surface of an article or the like, followed by curing, the film could also have excellent hardness. As a result, the composition can be favorably used in wide applications requiring both the hardness and the antifouling property.

In addition, the composition according to the present invention has the advantages that an ordinary hard coat agent (particularly an antifouling hard coat agent) is hardly adhered to it, and the composition has excellent adhesion to a specific polyolefin based substrate, an acrylic substrate, and a fluorine resin based substrate.

BEST MODE TO CARRY OUT THE INVENTION

In the following, the details of the present invention will be explained in detail. Note that "--to--" is used in the specification of the present application to mean that a lower limit numerical value and an upper limit numerical value before and after "to" are included.

Further, the polymerization mentioned in the present invention is meant to include the so-called copolymerization, unless specified otherwise. Therefore, the polymer includes the copolymer, too.

Room temperature mentioned in the present invention means a temperature of a place where an experiments and the like are being carried. It means a temperature of 15 to 30° C., for example, and more preferably 20 to 25° C. Further, the ordinary concentration of oxygen means 18 to 20%, preferably 19 to 21%.

(A) Organic Polymer

The organic polymer according to the present invention contains 5 to 30 weight percent of the radical polymerizable monomer having the perfluoroalkyl group, 0.01 to 5 weight percent of α, ω-dimercaptopolysiloxane, 5 to 40 weight percent of the radical polymerizable monomer having the cationic photo polymerizable epoxy group, and 25 to 75 weight percent of other radical polymerizable monomer copolymerizable with them, said organic polymer having the structure corresponding to the copolymer of the monomer mixture in which the molar ratio of the mercapto groups to the epoxy groups is 0.0001 to 0.025. Alternatively, the organic polymer has the structure in which (meth)acrylic acid is reacted with the epoxy groups of this copolymer. The organic polymer may have both of the structures.

The organic polymer according to the present invention is preferably an organic polymer characterized in that when a film in a thickness of 5 μm is formed by applying the organic polymer in agreement with the above requirements (which hereinafter is called (A) in some cases) on a adhesive polyethylene terephthalate (PET) substrate in a thickness of 100 μm and polymerizing it through irradiation with active energy rays, the film exhibits a pensile hardness of HB or higher, a contact angle to water of at least 100 degrees and a contact angle to hexadecane of at least 40 degrees.

Herein, an ultraviolet ray, an electron beam, α-rays, β-rays, γ-rays, etc. are mentioned as preferable examples of the active energy rays. Therefore, as to the "polymerized through irradiation with the active energy rays" in the present invention, the radical photo polymerization or the cationic photo polymerization is cited as a preferable example.

As the organic polymer (A) according to the present invention, use may be preferably made of the polymer obtained by mixing and radical polymerizing, at specific ratios, the radical polymerizable monomer having the perfluoroalkyl group (which is hereinafter called (A-F) in some cases), α,ω-dimercaptopolysiloxane (which is hereinafter called (A-Si) in some cases), the radical polymerizable monomer having the cationic photo polymerizable epoxy group (which is hereinafter called (A-2) in some cases), and the radical polymerizable monomer radical copolymerizable with those monomers (which is hereinafter called (A-3) in some cases) as well as the polymer having the structure corresponding to the above.

In the organic polymer (A), the radical polymerizable monomer having the perfluoroalkyl group (A-F) largely involved in exhibiting the antifouling property against oily stain such as fingerprints. The reason is considered that the above group has excellent oil repellency. On the other hand, the α,ω-dimercaptopolysiloxane is largely involved in exhibiting the total antifouling property. Since this group has high water repellency, it is considered that the group can particularly enhance the antifouling property against hydrophilic stain.

Further, since the organic polymer (A) has the cationic polymerizable group originating from the radical polymerizable monomer component having the cationic photo polymerizable epoxy group, (A-2), the cationic polymerization of the composition containing the organic polymer (A) proceeds to the curing. Since the cation polymerization is less interrupted with oxygen differently from the radical polymerization, a coated film formed by applying the composition containing the organic polymer (A) (which film may be, hereinafter, referred to simply as "coated film") even in the form of a thin film can be sufficiently cured. Since the ring-opening polymerization of the epoxy groups causes lower shrinkage as compared with the addition polymerization with unsaturated bonds, warping or distortion is unlikely to occur, so the thickness can be increased.

Particularly, the composition containing the organic polymer in which the cationic photo polymerizable groups are converted to the radical photo polymerizable groups through addition of (meth) acrylic acid thereto ((A) having the structure in which (meth)acrylic acid is reacted with the epoxy groups) is relatively less interrupted with oxygen when being cured, although it is radical polymerizable. The composition gives low shrinkage, and is still suitable for both thin film and thick the film.

In the following, these monomers will be explained.

(A-F): Radical Polymerizable Monomer Having a Perfluoroalkyl Group

In the present invention, the perfluoroalkyl group is a term including a perfluoroalkylene group. In the following, it is called the perfluoroalky (alkylene) group in some cases.

As such a monomer, a (meth) acrylate having a perfluoroalkyl (alkylene) group is most preferable. Further, that monomer may possess any substituting group, so long as it does not conspicuously affect the effects of the present invention.

As such monomers, mention may be made of, for example, perfluorooctylethyl methacrylate, perfluorodecylethyl methacrylate, perfluorohexylethyl acrylate, pentafluoroethyl methacrylate, methoxyethyl perfluoroethylene ethyl acrylate, etc. As a matter of course, the monomers are not limited to them.

The number of carbon atoms of the perfluoroalkyl (alkylene) group is preferably at least 3, more preferably at least 5. If it is at least 3, the antifouling property can be further enhanced. On the other hand, the upper limit of the number of carbon atoms of the perfluoroalkyl (alkylene) group is not particularly specified but it may be set at most 15. When it is at most 15, the hardness can be further raised.

Furthermore, the perfluoroalkyl (alkylene) groups are preferably contained in side chains of the polymer.

One kind of (A-F) may be used singly or two or more kinds thereof may be used in combination.

(A-F) is contained at least 5 weight percent, preferably at least 10 weight percent in the organic polymer (A). When the amount is less than 5 weight percent, the antifouling property originating from the perfluoroalkyl (alkylene) group becomes insufficient. On the other hand, (A-F) is contained in an amount of at most 30 weight percent in the organic polymer (A), which is preferably at most 25 weight percent. If the amount is more than 30 weight percent, the hardness of the polymer decreases, and the surface scratching resistance and the pensile hardness decrease.

(A-Si): α,ω-Dimercaptopolysiloxane

In the present invention, α,ω-dimercaptopolysiloxane (A-Si) has a polysiloxane structure including at least two of the following repeating structural units: —(SiR$^1$R$^2$—O)— in which each of R$^1$ and R$^2$ represents an alkyl group or a phenyl group which may be substituted. Each of R$^1$ and R$^2$ is preferably an alkyl group which may be substituted by a hydroxy group or an alkoxyl group. Each of R$^1$ and R$^2$ is more preferably a C1-C3 alkyl group which may be substituted by a hydroxyl group or an alkoxyl group. Each of R$^1$ and R$^2$ is further more preferably a C1-C3 alkyl group having no substituting group, and most preferably a methyl group.

(A-Si) may have any substituting group, so long as it does not deviate from the purpose of the present invention.

(A-Si) preferably has the number average molecular weight of around 1000 to 5000. When (A-Si) having the number average molecular weight in this range is used, the antifouling property and the hardness can be realized in a well balanced manner.

As (A-Si), mention may be made of, for example, α,ω-dimercaptopolydimethylsiloxane, α,ω-dimercaptopolydiethylsiloxane, α,ω-dimercaptopolymethylethylsiloxane, α,ω-dimercaptopolydihydroxymethylsiloxane, α,ω-dimercaptopolydimethoxymethylsiloxane, etc., and α,ω-dimercaptopolydimethylsiloxane is preferable.

One kind of (A-Si) may be used singly or at least two kinds thereof may be used in combination.

(A-Si) is contained in an amount of at least 0.01 weight percent in the organic polymer (A). If it is less than 0.01 weight percent, the antifouling property is insufficiently exhibited. (A-Si) is contained in the organic polymer (A) in a range of at most 5 weight percent. When it exceeds 5 weight percent, the lipophilicity increases, so that the fingerprint antifouling property decreases, and the wiping performance is deteriorated owing to too high slipping property.

(A-2): Radical Polymerizable Monomer Having Cationic Photo Polymerizable Epoxy Group As (A-2), mention can be made of acrylic esters, methacrylic esters, acrylamides, methacrylamides, etc. which have epoxy groups or oxetane groups at side chains. As typical examples, mention may be made of glycidyl acrylate, glycidyl methacrylate, 3,4-epoxycyclohexyl acrylate, 3,4-epoxycyclohexyl methacrylate, 3,4-epoxycyclohexylmethyl acrylate, 3,4-epoxycyclohexylmethyl methacrylate, 1-methyloxatanyloxymethyl acrylate, 1-methyloxetanyloxymethyl methacrylate, etc. (A-2) is not limited to them.

Among them, a acrylate having an cationic photo polymerizable epoxy group is preferred from the viewpoint that modification is easily made with (meth)acrylic acid and it is easily available. Particularly, glycidyl methacrylate, 3,4-epoxycyclohexyl acrylate, 3,4-epoxycyclohexyl methacrylate, 3,4-epoxycyclohexylmethyl acrylate, 3,4-epoxycyclohexylmethyl methacrylate, etc. are preferable.

(A-2) may be used singly or two or more kinds thereof may be used in combination.

(A-2) is contained in an amount of at least 5 weight percent in the organic polymer, which is preferably at least 10 weight percent. When it is less than 5 weight percent, the high curability and the highly cured effect, the enhanced surface curability, etc. depending on the cationic photo polymerization (or radical photo polymerization by the modification with (meth)acrylic acid) cannot be exhibited.

(A-2) is contained in a range of at most 40 weight percent in the organic polymer, which is preferably at most 35 weight percent. When it exceeds 40 weight percent, it may be sometimes that the viscosity of the polymer solution increases or its liquid stability is reduced. In addition, further improvement of the enhanced curability or the increased hardness is not seen.

Moreover, the molar ratio of the mercapto groups contained in the (A-Si) to the epoxy groups contained in (A-2) is set at 0.0001 to 0.025. That is, the radical polymerization needs to be performed with the mercapto groups being in the range of 0.0001 to 0.025 to one mole of the epoxy groups.

In the reaction between the mercaptosiloxane and the ordinary radical polymerizable monomer, the above control on the ratio between the functional groups is unnecessary. However, since the mercapto groups can react with the epoxy groups, according to the present invention, the ratio is controlled in such a range that increased viscosity and decreased solubility by crosslinking or branching through the reaction between the mercapto groups and the epoxy groups is not substantially caused.

When the molar ratio of the mercapto groups to the epoxy groups is less than 0.0001, it is feared that the polymerization terminating effect based on the chain transfer of the mercapto groups is not exhibited. On the other hand, when it is more than 0.025, the reaction between the epoxy groups and the mercapto groups cannot be ignored as a side reaction. Consequently, it is feared that the crosslinking or branching occurs, gelation and insolubilization is caused during the polymerization, and the viscosity conspicuously increases, or compatibility other component(s) is remarkably lowered.

The molar ratio of the mercapto groups to the epoxy groups is preferably at least 0.0005. Further, the molar ratio of the mercapto groups to epoxy groups is preferably at most 0.020.

(A-3): Copolymerizable, Other Radical Polymerizable Monomer

As (A-3), the radical polymerizable monomer is not particularly limited, so long as it is radical-copolymerizable with (A-F), (A-Si) and (A-2). Preferably, it is a monomer which has a low reactivity with an epoxy group but does not lower the stability of the produced polymer, or a monomer which has a rigid structure and does not lower the hardness.

Specifically, styrene, styrene derivatives substituted by a lower alkyl group (for example, an alkyl group having 1 to 4 carbon atoms) or a lower alkenyl group (for example, an alkenyl group having 2 to 4 carbon atoms), a C1-C8 alkyl (meth)acrylate, a C1-C8 alkyl (meth)acrylamide, a cycloalkyl (meth)acrylate having a C5-C20 (poly)cycloalkyl side chain, a (meth)acrylamide, etc. can be illustrated. Among them, the C-C8 alkyl (meth)acrylate is preferred.

(A-3) may be used singly or two or more kinds thereof may be used in combination.

When the mixture of the above radical polymerizable monomers is radically copolymerized, a solvent may be added to improve homogeneity. As preferred examples of such a solvent, mention may be made of, for example, ketones such as acetone, methylethyl ketone (MEK), etc., alcohols such as ethanol, methanol, isopropyl alcohol (IPA), isobutanol, etc., ethers such as ethylene glycol dimethyl ether, propylene glycol monomethyl ether, etc., esters such as ethyl acetate, propylene glycol monomethyl ether acetate, 2-ethoxyethyl acetate, etc., aromatic hydrocarbons such as toluene, etc., or water.

Although a method of mixing and dissolving the polymerizable components into the solvent is not particularly limited, for example, the polymerization is initiated by adding a radical polymerization initiator within a given time period (preferably within 3 hours) after the mixing.

As such a radical polymerization initiator, common radical polymerization initiator can be used. As preferred examples, mention may be made of organic peroxides such as benzoyl peroxide, di-tert-butyl peroxide, etc., azo-based radical polymerization initiators such as 2,2'-azobisbutylonitrile, 2,2'-azobis(2,4-dimethyl valeronitrile), 2,2'-azobis(4-methoxy-2,4-dimethyl valeronitrile), etc.

The total concentration of the monomer components in the mixture is preferably 10 to 60 weight percent. The radical polymerization initiator is used in an amount of preferably 0.1 to 10 weight percent, more preferably 0.1 to 4 weight percent, and more preferably 0.2 to 2 weight percent. Although preferred polymerization temperature and polymerization time depend upon the radical polymerization initiator used, generally the polymerization temperature is 20° C. to 150° C., and the polymerization time is 1 hour to 72 hours.

(Ai) Organic Polymer

In the composition containing the organic polymer (A), a part may be substituted by the following organic polymer (Ai) (which is hereinafter abbreviated as (Ai) in some cases).

The organic polymer (Ai) is an organic polymer having a structure corresponding to a copolymer of a mixture containing a linear alkyl (meth)acrylate (A-L) having 12 or more carbon atoms and a radical polymerizable monomer (A-2) having a cationic photo polymerizable epoxy group (preferably, a structure of the copolymer of the mixture containing (meth)acrylate) and/or a structure in which (meth)acrylic acid is reacted with the epoxy groups of said copolymer. Although the lipophilicity is increased by using this organic polymer (Ai) in combination, it has an effect making an oily stain less recognizable. For example, the combined use is suitable for applications, such as applications to specific touch panels and displays, in which when a fingerprint is attached, it is desired to be made less recognizable even before wiping off.

The organic polymer (Ai) has the structure corresponding to the radical copolymer of the mixture of the monomers including 5 to 35 weight percent of (meth)acrylate (A-L) of a linear alkyl having 12 or more carbon atoms, 5 to 40 weight percent of a radical polymerizable monomer (A-2) having a cationic photo polymerizable epoxy group, and 25 to 75 weight percent of other radical polymerizable monomer (A-3) copolymerizable with these polymers. Alternatively, the organic polymer has the structure in which (meth)acrylic acid is reacted with the epoxy groups. The polymer may have both of the structures.

As the radical polymerizable monomer (A-L) having the linear alkyl group with 12 or more carbon atoms, (meth)acrylates having the linear alkyl groups with 12 or more carbon atoms can be recited by way of example. For example, mention may be made of lauryl acrylate, lauryl methacrylate, myristyl acrylate, myristyl methacrylate, stearyl acrylate, stearyl methacrylate, behenyl acrylate, behenyl methacrylate, etc. However, as a matter of course, (A-L) is not limited to them. The number of carbon atoms of the linear alkyl group is ordinarily at most 30. One kind of (A-L) may be used singly or two or more kinds thereof may be used in combination.

As (A-2) and (A-3), those similar to what are explained in the organic polymer (A) can be used. The polymerization method, the polymerization conditions, etc. are similar to those explained in connection with the organic polymer (A).

Next, the composition according to the present invention will explained. The composition of the present invention contains at least the organic polymer (A), and further contains at least one of a cationic photo polymerization initiator and a radical photopolymerization initiator (D). The composition may contain both of them. When the organic polymer (A) or the organic polymer (Ai) has the epoxy groups, at least the cationic photopolymerization initiator (C) is contained. When the organic polymer (A) or the organic polymer (Ai) has the structure in which (meth)acrylic acid is reacted with the epoxy groups, at least the radical photopolymerization initiator (D) is contained. The reason is that the cured film having sufficient hardness is to be obtained.

The composition according to the present invention preferably contains the following component (B).

As the component (B), there are two type: (Bi) an organic/inorganic composite which comprises fine particles of inorganic oxide composed mainly of colloidal silica and (meth)acryloyl groups which are bonded to the inorganic oxide fine particles via —O—Si—R— bonds (R represents a linear or branched alkylene group having 2 to 10 carbon atoms) and (Bii) a polyfunctional (meth)acrylate containing at least three (meth)acryloyl groups per one molecule.

(Bi) Organic/Inorganic Composite

The organic/inorganic composite which can be used in the present invention comprises the inorganic oxide fine particles and the (meth)acryloyl groups bonded to the inorganic oxide fine particles via the —O—Si—R— bonds. Herein, R represents the linear or branched alkylene groups having 2 to 10 carbon atoms. The alkylene group may or may not have a substituent group, (B-1) Silane Coupling Agent Having a (meth)acryloyl Group The organic-inorganic composite (which is hereinafter called (B) in some cases) which can be used in the present invention can be produced by using (B-1): a silane coupling agent having a (meth)acryloyl group, for example.

In order to bond the (meth)acryloyl groups to the surfaces of the inorganic oxide fine particles via the —O—Si—R bonds (more preferably —O—Si—R—S— bonds) (R represents the linear or branched alkylene groups having 2 to 10 carbon atoms), it is preferable to use a silane coupling agent having a (meth)acryloyl group (which is hereinafter called (B-1) in some cases).

As one preferred example of such a (B-1), a silane coupling agent having a molecular weight of at least 300 and one or more acryloyl groups or methacryloyl groups as radical polymerizable functional groups can be used. The number of the acryloyl groups or methacryloyl groups is not particularly limited, but one molecule preferably possesses 1 to 5 polymerizable functional groups. Further, its position is not particularly limited, but it preferably exists at a terminal of the molecule. In addition, (B-1) is preferably an organic compound having a functional group shown by the following formula (1) as well.

  Formula (1)

(In the formula (1), X and Y independently represent an oxygen atom, a sulfur atom or an imino group.)

The functional group represented by the formula (1) has the effects of increasing the mechanical strength by the generation of appropriate cohesive forces due to hydrogen bonds between molecules and enhancing the adhesion to the substrate, heat resistance, etc. Further, the functional groups serve as a spacer between the surfaces of the inorganic oxide fine particles and the radical polymerizable functional groups. More specifically, —OCONH—, —SCONH—, —SCSNH—, —OCSNH—, —NHCONH—, —NHCSNH— (which are hereinafter called altogether by Formula (2) in some cases), etc. can be recited. Among these groups, —OCONH— and —SCONH— are particularly preferable n view of thermo stability and ease of synthesis.

Further, (B-1) may be an organic compound having a thioether group as well. The thioether group is preferable, because it acts as a spacer between the surface of silica and the radical polymerizable functional group or specific polar functional groups, and it has an effect of suppressing excessive cohesion.

As the functional group of the silane coupling agent bondable with the inorganic oxide fine particle, an alkoxysilyl group which is a group capable of generating a silanol group is particularly preferable. As the alkoxysilyl group, monoalkoxy silyl group, dialkoxy silyl group and trialkoxysilyl group can be used. Among them, a trialkoxysilyl group of a lower alcohol, such as trimethoxy silyl group or triethoxy silyl group is particularly preferable in consideration of the reactivity. The positions of these groups in the molecules are preferably a terminal of the molecule on a side opposite to the (meth)acryloyl group. Further, the number of the group(s) in one molecule is preferably 1 to 3, and more preferably 1.

The silanol group or a unit for producing the silanol group is a producing unit which is bonded to the inorganic oxide fine particle by the condensation reaction or the condensation reaction caused after hydrolysis. Preferred examples of such compounds can be illustrated as follows.

1) a compound obtained by bonding OH group of a (meth)acrylate compound having the OH group and an NCO group of a trialkoxysilane having the NCO group by way of a —OCONH— bond,
2) a compound obtained by bonding an SH group of a trialkoxysilane compound having the SH group and one NCO group of a diisocyanate by way of a —NHCOS—, and a (meth)acrylate compound having an OH group and the diisocyanate by way of a —NHCOO— bond by acting the OH group upon a remaining group the NCO group.
3) a compound obtained by bonding an NCO group of a (meth)acrylate compound having the NCO group and an SH group of a trialkoxysilane having the SH group via —NHCOS— bond.
4) a compound obtained by bonding a compound containing at least two (meth)acryloyl groups inside a molecule and a trialkoxysilane having a SH group by way of a thioether bond produced by a Michael addition reaction of the SH group to an unsaturated group ((meth)acryloyl group), and
5) a compound obtained by bonding a mono(meth)acrylate ester of α,ω-hydroxy terminal polyalkylene glycol and a silane coupling agent having an NCO group, etc. It is needless to say that the production unit is not limited to these compounds.

As the (meth)acrylate having the OH group, mention can be preferably made of, for example, mono(meth)acrylate (hydroxyethyl acrylate, hydroxyethyl methacrylate, hydroxypropyl acrylate, hydroxypropyl methacrylate, etc.), di(meth)acrylate (glycerin di(meth)acrylate, trimethylol propane di(meth)acrylate, etc.), tri- to poly(meth)acrylate (pentaerythritol triacrylate, dipentaerythritol, tri- to pentaacrylate, ditrimethylol propane triacrylate, etc.).

As the trialkoxysilane compound having the NCO group, mention may be made of, for example, compounds in which triethoxysilylpropyl isocyanate (KBE9007, etc. manufactured by Shin-Etsu Chemical Co., Ltd.), trimethoxysilylpropyl isocyanate, and compounds in which a trialkoxysilylalkyl mercaptan such as trimethoxysilylpropyl mercaptan (KBM803 manufactured by Shin-Etsu Chemical Co., Ltd., SH6062 manufactured by Dow Corning Toray Co., Ltd., etc.) is bonded with one NCO group of a diisocyanate (isophoron diisocyanate, hexamethylene diisocyanate, diphenylmethane diisocyanate (MDI), toluene diisocyanate (TDI), etc.) by way of a thiourethane bond.

The OCONH— bond is formed through the reaction between the OH group and the NCO group by a method in which the compounds are mixed at a rate of the NCO groups/OH groups of the compounds of at most 1 and stirred at 60 to 100° C. for 1 hour to 20 hours. In the present reaction, it is preferably to use a polymerization inhibitor, for example, such as hydroquinone, hydroquinone monomethyl ether, catechol, p-tert-butylcatechol, phenothiazine or the like so as to inhibit polymerization with acryl groups in the reaction, etc. The mixing amount of the polymerization inhibitor to the reaction mixture is preferably 0.01 to 1% by weight, and more preferably 0.05 to 0.5% by weight. In order to accelerate the reaction, a publicly known reaction catalyst such as di-n-butyl tin dilaurate, diazabicyclooctane (DABCO), etc. may be used. The present reaction may be performed in a solvent not containing a group reactable with the isocyanate group, for example, a ketone-type solvent such as methyl ethyl ketone, methyl isobutyl ketone or the like, an ether-type solvent such as ethylene glycol diethyl ether, diethylene glycol dimethyl ether or the like, a carboxylic acid ester-type solvent such as ethyl acetate, butyl acetate or the like, an aromatic hydrocarbon solvent such as xylene, toluene or the like or at the same time in the presence of a polyfunctional acrylate having at least three (meth)acryloyl groups inside a molecule.

As the (meth)acrylate compound having the NCO group, illustration can be made of, for example, β-isocyanate ethyl (meth)acrylate (Karenz MOI or Karenz AOI manufactured by Showa Denko K.K.) or a compound in which a (meth)acrylate having a OH group (Karenz MOI or Karenz AOI manufactured by Showa Denko K. K.) is bonded to one NCO group of a diisocyanate ((isophoron diisocyanate, hexamethylene diisocyanate, MDI, TDI, etc.) by way of an urethane bond.

As the trialkoxy silane compound having the SH group, trimethoxy silyl propyl mercaptan (KBM803 manufactured by Shin-Etsu Chemical, Co., Ltd., SH6062 manufactured by Dow Corning Toray Co., Ltd., etc.) and the like can be illustrated.

The NHCOS— bond can be formed by the reaction between the NCO group and the SH group in the same manner as in the production of the —NHCOO— bond by the reaction between the NCO group and the OH group.

As the mono(meth)acrylic acid ester compound of the $\alpha,\omega$-hydroxy terminal polyalkylene glycol, illustration can be made of, for example, polyethylene glycol mono(meth)acrylate, polypropylene glycol mono(meth)acrylate, polytetramethylene glycol mono(meth)acrylate, poly(ethylene/propylene)glycol mono(meth)acrylate, poly(ethylene/tetramethylene)glycol mono(meth)acrylate, etc.

The mono(meth)acrylic acid ester compound of the $\alpha,\omega$-hydroxy terminal polyalkylene glycol and the trialkoxysilyl compound having the NCO group can be reacted by the same method as in the formation of the —NHCOO— bond through the reaction between the NCO group and the OH group.

(B-2) Fine Particles of Inorganic Oxide

The inorganic oxide fine particles (which is hereinafter called (B-2) in some cases) is not particularly limited, so long as they departs from the purpose of the present invention. Oxides or composite oxides of silicon, aluminum, zirconium, titanium, zinc, lead, germanium, indium, tin, antimony, cerium and lithium are preferred. Specifically, illustration can be made of those composed mainly of an oxide of silicon (silica), an oxide of aluminum (alumina), a composite oxide of silicon-aluminum, an oxide of zirconium (zirconia), an oxide of titanium (titania), zinc oxide, tin oxide, an antimony-doped tin oxide, an indium-tin composite oxide (ITO), cesium oxide, a composite oxide of silica-lithium oxide, etc. Among them, that composed mainly of silica (colloidal silica) is particularly preferable.

For example, "composed mainly of colloidal silica" is intended to encompass "composed of colloidal silica alone".

The shapes the fine particles of the inorganic oxide are preferably spherical, hollow, porous, bar-shaped, fibrous, plate-shaped or of unfixed shapes. The spherical shape is more preferable. The "spherical shape" referred to in the present invention includes not only a strictly spherical shape but also a substantially spherical shape.

The diameter of a primary particle of the inorganic oxide fine particle is preferably 1 to 100 nm. When the diameter of the primary particle is set at at least 1 nm, the mechanical performance is made more preferable, whereas when it is set at most 100 nm, the secondary aggregation can be more effectively prevented, and loss of transparency can be more effectively avoided.

The inorganic oxide fine particles of the present invention are available in a dried powder state or in a state that they are dissolved or dispersed in water or an organic solvent. A sol in which the fine particles are dissolved or dispersed in water or the organic solve (which is called sol of the inorganic oxide fine particles in some cases) is preferable, because it has a excellent dispersibility.

Specifically, an aqueous silica sol as dissolved or dispersed in water or an organo-silica sol as dissolved or dispersed in an organic solvent having an OH group or a polar organic solvent having an ester group or a ketone group is pr ably used as a main component.

As the aqueous silica sol, illustration can be made, as preferable examples, of a basic aqueous silica sol (ST-20 manufactured by Nissan Chemical Industries, Ltd.), an acid aqueous silica sol (ST-O manufactured by Nissan Chemical Industries, Ltd.), a weak acidic aqueous silica-alumina sol (ST-AK manufactured by Nissan Chemical Industries, Ltd.), and a basic silica-lithium oxide sol (lithium silicate manufactured by Nissan Chemical Industries, Ltd.)

As the organo-silica sol, illustration can be made, as preferred examples, of IPA dispersion organo-silica sol (IPA-ST, IPA-ST-ZL manufactured by Nissan Chemical Industries, Ltd.), MEN dispersion organo-silica sol (MEK-ST, MEN-ST-MS manufactured by Nissan Chemical Industries, Ltd.), MIBK dispersion organo-silica sol (MIBK-ST manufactured by Nissan Chemical Industries, Ltd.), PMA dispersion organo-silica sol (PMA-ST manufactured by Nissan Chemical Industries, Ltd.), and sols obtained by using the above, as starting materials, of which solvent are replaced by other organic solvents having a OH group (for example, PGM dispersion organo-silica sol, etc.).

As the organic solvents mentioned here, illustration can be made of methanol, isopropanol, n-butanol, isobutanol, ethylene glycol, ethylcellosolve, propylene glycol monomethyl ether acetate, propylene glycol monomethyl ether, methyl ethyl ketone, methyl isobutyl ketone, dimethylacetamide, xylene, and mixed solvents thereof.

The solid content in the dispersed liquid is preferably 5 to 50 weight percent, more preferably 10 to 40 weight percent from the viewpoint of easy handling and availability.

(B-3) Specific Producing Method (1)

The inorganic oxide fine particles (B-2) can be bonded to the silane coupling agent (B-1) having the (meth)acryloyl group by various methods generally used in the production of such kinds of the compounds. Fundamentally, a method is common, in which the silanol groups are produced by hydrolyzing the alkoxy silyl groups of (B-1), and are subjected to the bonding through a condensation reaction with the hydroxy groups and the alkoxy groups at the surfaces of the fine particles of the inorganic oxide.

Water is used in such a range that it does not affect the performance of the film or the stability of the coating liquid. The addition amount of water may suffice in an amount of at least that capable of hydrolyzing 100%, as the theoretical amount, of (B-1). Water is added in an amount corresponding to 100 to 300%, and more preferably 100 to 200%.

Further, as the water used, distilled water, ion-exchanged water, industrial water, soft water, etc. can be recited.

Furthermore, in order to accelerate the hydrolysis condensation reaction, an acid, an alkali or other appropriate compound may be added as a catalyst. As these compounds, various ones can be used, provided that they do not affect the performance of the film or that of the coating liquid. For example, as an acid catalyst, illustration can be made of a solution of hydrogen chloride, a solution of phosphoric acid, and inorganic acids such as boric acid, organic acids such as citric acid, maleic acid, acetic acid, p-toluenesulfonic acid, etc. As the alkaline catalyst, alcoholic potassium hydroxide, ammonia, and trialkylamines, heterocyclic ring-containing amines such as dimethylamino pyridine, etc. can be illustrated. Others such as metal acetyl acetone complexes including aluminum triacetyl acetonate, etc. are usable. The use amount thereof is preferably 0.01 to 5 parts by weight, more preferably 0.5 to 5 parts by weight relative to 100 parts by weight of the silane compound.

The reaction is performed preferably at 20 to 100° C. for 1 hour to 100 hours (more preferably 20 to 25° C. for at least 4 hours), and then advanced by heating at 40 to 70° C. for 1 to 10 hours. Further, in order to suppress a side reaction, the reaction system may be diluted with a solvent. As the solvent used, ones compatible with water or the catalyst are preferable. For example, illustration may be made of alcohols such as methanol, ethanol, isopropanol, isobutanol, etc., ketones such as acetone, methyl ethyl ketone, methyl isobutyl ketone, etc., ethers such as tetrahydrofuran, dioxane, etc., hydroxyl group-containing ethers such as propylene glycol monomethyl ether, etc.

The weight ratio between the inorganic oxide fine particles (solid component) and the silane compound is preferably 100/0.1 to 100/10, and more preferably 100/1 to 100/5. Setting the weight ratio in this range is preferable, because an appropriate amount of the functional groups can be introduced into the inorganic oxide fine particles (B-2).

Apart from the above, a method can be employed, in which the alkoxysilyl compound capable of producing the bonding groups shown in the formula (1) or (2) among the components capable of synthesizing the above (B-1) are reacted with the sol of the inorganic oxide fine particles, then the other compound is reacted with the resultant, and the polymerizable unsaturated groups and the bonding groups shown in the formula (1) or (2) are introduced. Among the silane compounds capable of introducing the bonding groups of the formula (1), the trialkoxy silane compound having the SH group, which is a compound having the alkoxysilyl group, may be reacted with the inorganic oxide fine particles (B-2) in advance.

For example, the same structure as is obtained by the beforementioned method can be obtained by a method in which the trialkoxy silane having the SH group is reacted with (B-2), then the SH group is reacted with the diisocyanate compound to perform connection via NHCOS bond by using one of the NCO groups, and the (meth)acrylate compound having the OH group is reacted with the remaining NCO group to perform connection with the NHCOO bond.

Further, the same structure as is obtained by the beforementioned method can be obtained by a method in which the trialkoxysilane having the SH group is reacted with (B-2), then the resultant is reacted with the (meth)acrylate compound and/or the (meth)acryl amide compound having the NCO group.

In this case, the reaction ratio between the trialkoxysilane having the SH group and the (B-2) is ordinarily 0.1/99.9 to 95/5, preferably 2/98 to 90/10, more preferably 10/90 to 80/20 in terms of the weight ratio. The reaction ratio is more preferably set in such a range, because the surface of the inorganic oxide can be more sufficiently protected, the dispersed state can be kept more stable through the polymerization of the alkoxysilane itself and the crosslinking, and increase in the viscosity can be prevented. Further, the molecular weight of the trialkoxy silane having the SR group is preferably at least 150, and more preferably at least 300. Setting the molecular weight to at least 150 is preferable, because the effect of forming the protective colloid can be enhanced, and the aggregation and the gelation through the condensation of the trialkoxysilane having the SH group itself and the crosslinking can be more effectively suppressed.

The reaction is performed preferably at a temperature of from a room, temperature 100° C. for from 1 hour to 100 hours, and more preferably at a room temperature for at least 4 hours, and thereafter the reaction is advanced by heating at room temperature to 70° C. for 1 to 10 hours. The reaction system may be diluted with a solvent so as to suppress a side reaction. This solvent is preferably a solvent compatible with the silane alkoxide as a hydrolysis product, water or a catalyst. For example, illustration can be made of alcohols such as methanol, ethanol, isopropanol, etc., ketones such as acetone, methyl ethyl ketone, methyl isobutyl ketone, etc., ethers such as tetrahydrofuran, dioxane, etc., hydroxyl group-containing ethers such as propylene glycol monomethyl ether, etc., and the like.

Further, a part (less than 50% by weight) of (B-1) may be replaced by other silane coupling agent. As other silane coupling agent, in addition to various, publicly known, commercially available silane coupling agents, mention can be made of, for example, a silane coupling agent having a polyalkylene glycol structure without a radical polymerizable functional group, a silane coupling agent having a COOH group or a COOR' group (R' is a substituting group), a silane coupling agent having an alicyclic structure, a silane coupling agent obtained by reacting a bulky alcohol having a branched structure with an alkoxysilyl group having an NCO group, etc.

(B-4) Specific Producing Method (2)

As a method for producing the inorganic oxide fine particles in which the side chain of (B) has a group with a silyl ether group (functional group) represented by the following structural formula in addition to the beforementioned methods, the following method can be employed.

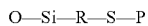

In the above formula, R is an alkylene group which may have a branch having 2 to 10 carbon atoms, and P is a polymer unit having at least one (meth)acryloyl group. The present method has a feature that the purity of the product is high.

The above fine particles are obtained by hydrolysis condensing the inorganic oxide fine particles (B-2) in the presence of mercaptosilane (first step), radical polymerizing the reactant with at least one kind of the monomer having at least one epoxy group and at least one radical polymerizable group (second step), and adding a compound having a carboxyl group and a (meth)acryloyl group (third step) to the reactant.

(First Step)

The inorganic oxide fine particles are hydrolysis condensed in the presence of mercaptosilane. The reaction and the bonding between mercaptosilane and the sol of the inorganic oxide fine particles can be performed by various methods generally used in the production of the compounds of this kind. A method is popular, which fundamentally hydrolyzes the alkoxysilyl group of mercaptosilane to produce a silanol group, performing a hydrolysis condensation reaction of it with the silanol group and the alkoxy group and/or the hydroxy group of the surface of the inorganic oxide, and bonding them.

Water used is usable in such a range that it does not affect the performance of the film or the stability of the coating liquid. The addition amount of water is at least an amount that can hydrolyze its 100% as the theoretical amount of mercaptosilane. The addition amount is preferably an amount corresponding to 100 to 300%, and more preferably an amount corresponding to 100 to 200%.

Further, as water used, distilled water, ion exchanged water, industrial water and soft water can be illustrated.

Further, in order to accelerate the hydrolysis condensation reaction, an acid, an alkali or other appropriate compound may be added as a catalyst. Various compounds can be used, so long as they do not affect the performance of the film or the performance of the coating liquid. For example, illustration can be made of a solution of hydrogen chloride, a solution of phosphoric acid, and inorganic acids such as boric acid, etc., and organic acids such as citric acid, maleic acid, acetic acid, para-toluenesulfonic acid, etc. as the acid catalysts, and alcoholic potassium hydroxide, ammonia, trialkyl amines as the alkaline catalysts, heterocyclic ring-containing amines such as dimethylamino pyridine, in addition, metal acetyl acetone complexes such as aluminum triacetyl acetonate are effective.

The use amount of them is preferably 0.1 to 5 parts by weight, more preferably 0.5 to 5 parts by weight relative to 100 parts by weight of the mercapto lane.

The reaction is performed preferably at 20 to 100° C. for 1 hour to 100 hours (more preferably at 20 to 25° C. for at least 4 hours), and thereafter the reaction is advanced by heating at 40 to 70° C. for 1 to 10 hours. In order to suppress a side reaction, the reaction system may be diluted with a solvent. As the solvent used, ones compatible with water or the catalyst are preferable. For example, illustration can be made of alcohols such as methanol, ethanol, isopropanol, isobutanol, etc., ketones such as acetone, methyl ethyl ketone, methyl isobutyl ketone, etc., ethers such as tetrahydrofuran, dioxane, etc., hydroxyl group-containing ethers such as propylene glycol monomethyl ether, etc.

The weight ratio between mercapto silane and the inorganic oxide fine particles (solid component) in this reaction is preferably 0.1/99.9 to 95/5, and more preferably 2/98 to 90/10. Setting the weight ratio in this range is preferable, because an appropriate amount of the mercapto groups can be introduced to the inorganic oxide fine particles.

(Second Step)

At least one kind of the monomer having at least one epoxy group and at least one radical polymerizable group is radical polymerized in the presence of the compound obtained in the first step.

When the monomer is radical polymerized in the presence of the inorganic oxide fine particles having the mercapto groups, a chain transfer reaction occurs between the radicals of the monomer in the growing reaction and the mercapto groups bonded to the inorganic oxide fine particles during the polymerization step. Thereby, the polymer and the inorganic oxide fine particles are bonded via the sulfide bonds. At that time, the epoxy group in the monomer is maintained as it is.

As the monomer having the epoxy group and one radical polymerizable group used in the second step (which is hereinafter called "monomer having the epoxy group" in some cases), glycidyl (meth)acrylate, 3,4-epoxycyclohexyl (meth)acrylate, 3,4-epoxycyclohexylmethyl (meth)acrylate, etc. can be illustrated as preferred examples.

If necessary, the monomer having the above epoxy group can be radical copolymerized with other monomer. Other monomer is not particularly limited, so long as it does not react with the epoxy group.

The monomer (the monomer having the epoxy monomer and other monomer to be used in combination if desired) and the inorganic oxide fine particles (solid component) are subjected to the polymerization reaction preferably at the weight ratio of 30/70 to 95/5, and more preferably at the weight ratio of 50/50 to 90/10. When the weight ratio of the inorganic component is set at most 70, the inorganic oxide fine particles are more stabilized. When it is set at least 5, higher abrasion resistance is attained.

This radical reaction is performed in a solvent with use of an ordinary radical polymerization initiator. As the solvent, illustration can be made, as preferred examples, of alcohols (ethanol, isopropanol, isobutanol, etc.), ketones (acetone, methyl ethyl ketone, methyl isobutyl ketone, etc.), alcohols having an alkoxy groups (methoxy ethanol, ethylene glycol monoethyl ether, propylene glycol monomethyl ether etc.), ethers (ethylene glycol dimethyl ether, diethylene glycol dimethyl ether etc.), ether esters (propylene glycol monomethyl ether acetate, 2-ethoxyethyl acetate etc.), aromatic hydrocarbons (toluene, xylene, etc.), esters (ethyl acetate, propyl acetate, etc.) and the like. Further, they can be used in a mixed state.

As the radical polymerization initiator to be used in the polymerization reaction, use is preferably made of peroxides such as benzoyl peroxide, di-tert-butyl peroxide, cumene hydroperoxide, etc., and azo compounds such as 2,2'-azoisobutylonitrile, 2,2'-azobis-(2,4-dimethyl valeronitrile), 2,2'-azobis(4-methoxy-2,4-dimethyl valeronitrile), etc.

The concentration of the monomer in the reaction system is preferably 10 to 60% by weight, and generally the polymerization initiator is preferably 0.1 to 10% by weight relative to the total mass of the monomer.

(Third Step)

Next, a compound having a carboxyl group and a (meth)acryloyl is added the polymer synthesized in the second step.

As the compound with the carboxyl group and the (meth)acryloyl group to be used in the third step, adducts of (meth)acrylic acid, 2-(meth)acryloyl oxyethyl succinic acid, 2-(meth)acryloyl oxyethyl hexahydrophthalic acid, adducts such as pentaerythritol tri(meth)acrylate and acid anhydrides such as succinic anhydride, phthalic anhydride, hexahydrophthalic anhydride, etc., adducts of dipentaerythritol penta (meth)acrylate and acid anhydrides such as succinic anhydride, phthalic anhydride, hexahydrophthalic anhydride and the like, etc. can be illustrated, for example. In the above third step, the epoxy groups possessed by the polymer are reacted with the carboxyl groups possessed by the (meth)acryloyl group-introducing reagent. The polymer and the (meth)acryloyl group-introducing reagent are mixed such that the epoxy groups/carboxyl groups is preferably at a rate of at least 1, and more preferably at a rate of 1 to 10.

The reaction is preferably performed at 50 to 110° C. for 3 to 50 hours. In the present reaction, in order to accelerate the reaction, publicly known catalysts such as triethyl amine, tributyl amine, triethylene diamine, N,N-dimethylbenzylamine, benzyltrimethyl ammonium chloride, triphenyl phosphine, etc. can be used. The use amount thereof is preferably 0.01 to 2% by weight, and more preferably 0.05 to 1% by weight relative to the reaction mixture.

Furthermore, in the present reaction, in order to prevent the radical polymerization with the (meth)acryloyl groups, a polymerization inhibitor such as hydroquinone, hydroquinone monomethyl ether, catechol, p-tert-butylcatechol, phenothiazine or the like is preferably used, for example. The use amount of the polymerization inhibitor is preferably 0.01 to 1% by weight, and more preferably 0.05 to 5% by weight relative to the reaction mixture.

In addition, when such a component is used as the (Bi) component, it is desirable in some cases to further add a solvent so as to improve the coating performance.

The solvent to be used may be various reaction solvents used in the respective steps for the production of the above inorganic oxide fine particles. For example, the solvent may be the dispersion medium of the inorganic oxide fine particles used in the above first step. Further, it may be the solvent used in the reaction of the above second step. Furthermore, it may be the solvent to be used for the adjustment of the viscosity after the production of the above-mentioned inorganic oxide fine particles.

The employment of the following method is preferable in some case for the production of the inorganic oxide fine particles (B-2) on the ground that the purity of the product increases.

That is, at least one kind of a monomer having at least one epoxy group and at least one radical polymerizable group is radical polymerized in the presence of mercapto silane, thereby obtaining a polymer having an alkoxysilyl group at one terminal (First step). To this polymer is added a compound having a carboxyl group and a (meth)acryloyl group (Second step). Then, the inorganic oxide fine particles (B-2) are obtained by hydrolysis condensation in the presence of the above product (Third step).

The other conditions (detailed conditions of polymerization, addition and hydrolysis condensation) can be set according to the description of the above specific production method (B-4).

(Bii) Polyfunctional (meth)acrylate Containing at Least Three (meth)acryloyl Groups in One Molecule As the polyfunctional (meth)acrylate containing at least three (meth)acryloyl groups in one molecule, illustration can be made of, for example, pentaerythritol triacrylate, pentaerythritol tetraacrylate, dipentaerythritol pentaacrylate, dipentaerythritol hexaacrylate, ditrimethylol propane tetraacrylate, polyester acrylates, polyfunctional urethane acrylates, polyepoxy acrylates, triethoxy acrylate having an isocyanurate ring (ARONIX M315, M313, etc. manufactured Toagosei Co., Ltd.). However, the polyfunctional (meth)acrylate is not limited to the above.

The content of (B) (the total content of (Bi) and (Bii)) of the composition according to the present invention is not particularly limited, so long as it does not depart from the purpose of the present invention. However, when the composition is used as a composition required to have particularly high hardness, the preferred composition has the amount ratio of (B)/(A) of 99.5/0.5 to 80/20. Setting (A) to at most 20 is preferred, because it enables retaining of higher hardness. The more preferable range is 99/1 to 85/15.

In order to further improve the hardness and the anti blooking property resistance of the composition according the present invention, (B-1) may be mixed as it is untreated. The mixed amount in this case is 0.01 to 20 weight percent in terms of the solid content.

(C) Cationic Photopolymerization Initiator

The cationic photopolymerization initiator (C) is not particularly limited, but it is preferably an aromatic iodonium salt compound or an aromatic sulfonium salt compound. (C) is specifically a diaryl iodonium type or triaryl sulfonium salt type. Counter ions are preferably $PF_6$, $SbF_5$, $AsF_6$, $BPh_4$, $CF_3OSO_2$, etc. Two or more kinds of these photo polymerization initiators can be used in combination. The content of (C) can be appropriately determined depending upon the kind thereof, but it is preferably 0.5 to 10 parts by weight, and more preferably 1 to 5 parts by weight relative to 100 parts by weight of (A).

Further, in order to ensure the curability, amines (triethanol amine, etc.), phosphines (tributyl phosphines, etc.) and thioxanthones may be used in combination. In this case, these compounds are preferably 0.1 to 5 parts by weight relative to 100 parts by weight of (A).

(D) Radical Photopolymerization Initiator

As radical photopolymerization initiator, publicly known initiators can be widely employed. Preferable are alkylphenone type compounds, (α-hydroxyacetophenone type, α-aminoacetophenone type, benzyl ketal type, etc.), acylphosphine oxide type compounds, oxime ester type compounds, oxyphenylacetate esters, benzoin ethers, ketones/amine compounds, etc. Specifically, preferable are benzoin methyl ether, benzoin ethyl ether, benzoin isopropyl ether, benzoin isobutyl ether, diethoxyacetophenone, benzyldimethyl ketal, 2-hydroxy-2-methylpropiophenone, 1-hydroxycyclohexylphenyl ketone, benzophenone, 2,4,6-trimethylbenzoin diphenylphosphine oxide, 2-methyl-[4-(methylthio)phenyl]-2-morpholino-1-propane, 2-benzyl-2-dimethylamino-1-(4-morpholinophenyl)-butane-1-one, Michler's ketone, N,N-dimethylaminobenzoic acid isoamyl, 2-chlorothioxanthon, 2,4-diethylthioxanthon, etc. Two or more kinds of these photo polymerization initiators can be appropriately used in combination.

The content of the radical photo polymerization initiator can appropriately determined depending upon its kind. The content is preferably at most 10 weight percent, and more preferably 1 to weight percent relative to the total amount of the polymeric components (A) and (B).

It is particularly preferable in some cases that the following is used, as the radical photopolymerization initiator (D), in an amount of at least 20 weight percent of the component (D), because the inhibition of the polymerization with oxygen is reduced, and improvement in the surface curability and thin film, curability is seen. Specifically, examples of which include a) aminoacetophenone type initiators (for example, 2-methyl-[4-(methylthio)phenyl]-2-morpholino-1-propane, 2-benzyl-2-dimethyl-amino-1-(4-morpholinophenyl)-butane-1-one, etc. b) oxime ester type initiators (for example, IRUGACURE ONE-01 manufactured by Chiba Specialty Chemicals, Co., Ltd., etc.), c) α-hydroxy ketone type initiator+benzophene type sensitizer (for example, 1-hydroxycyclohexylphenyl ketone+Michler's ketone, etc.) and the like.

Depending upon the purpose, the composition according to the present invention can further contain at least one kind selected from the group consisting of (E) a radical polymerizable organic (meth)acrylate compound and/or a radical polymerizable organic (meth)acrylamide compound, (F) a polymer having a radial polymerizable group, (G) an organic epoxy compound, and (H) an organic oxetane compound.

(E) Organic (meth)acrylate Compound and/or (meth)acrylamide Compound

As the organic (meth)acrylate compound and/or (meth)acrylamide compound, an organic (meth)acrylate compound and an organic (meth)acrylamide compound having 1 to 2 (meth)acryl groups in one molecule are preferred. The organic (meth)acrylate compound and the organic (meth)acrylamide compound having 1 to 2 (meth)acryl groups in one molecule are preferred from the viewpoint of the adjustment of the viscosity and other physical properties. As the organic (meth)acrylate compound having one (meth)acryl group in one molecule, alkyl (meth)acrylates such as butyl methacrylate, stearyl acrylate, etc., acyclic (meth)acrylates such as cyclohexyl acrylate, isobornyl methacrylate, etc., acyclic (meth)acrylates, (meth)acrylates having aromatic rings, (meth)acrylates having hydroxy groups, (meth)acrylates having polyalkylene glycol chains are preferred, and the alkyl (meth)acrylates such as butyl methacrylate, stearyl acrylate, etc. alicyclic (meth)acrylates such as alkyl (meth)acrylates, cyclohexyl acrylate, isobornyl methacrylate, etc. are more preferable. As a matter of course, roe others are not intended to be excluded.

As the (meth)acrylate compound having two (meth)acryl groups in one molecule, di(meth)acrylates of aliphatic or alicyclic diols such as hexane diol diacrylates, etc., and polyalkylene glycol di(meth)acrylates such as polyethylene glycol diacrylates, etc are preferred. As a matter of course, the others are not intended to be excluded.

As the (meth)acrylamide compounds having 1 to 2 (meth) acryl groups in one molecule, alkyl (meth)acrylamides such as ethyl acrylamide, etc., and amino-containing alkyl(meth)acrylamides such as N,N-dimethylaminopropylacrylamide, etc., are preferred. As a matter of course, the others are not intended to be excluded.

Although the content of (E) can be appropriately determined depending upon its kind, the content is preferably at most 90 weight percent, and more preferably 10 to 80 weight percent of the total amount of the polymeric compounds (A) and (B).

(F) Polymer Having the Radical Polymerizable Group

The polymer having the radical polymerizable group is preferably a (meth)acrylate based polymer, other than (A), having a radical polymerizable group such as an acryloyl group or a metacryloyl group at its side chain, or a copolymer between such a polymer and other radical polymerizable monomer such as styrene or the like. Specifically, a polymer is preferred, which has a (meth) acryloyl group at its side chain and which is obtained by adding (meth) acrylic acid to a polymer that is obtained by polymerizing glycidyl acrylate, glycidyl methacrylate, 3,4-epoxy cyclohexyl acrylate, 3,4-epoxycyclohexyl methacrylate, 3,4-epoxycyclohexylmethyl acrylate, or 3,4-epoxycyclohexylmethyl methacrylate as a main component as a main component. As a matter of course, other than the above are not intended to be excluded.

Although the content of (F) can be appropriately determined depending upon its kind, the content is preferably at most 60 weight percent, and more preferably 0 to 40 weight percent of the total amount of the polymerizable components (A) and (B).

(G) Organic Epoxy Compound

As the organic epoxy compounds, a compound having two or more epoxy groups in one molecule and a compound having one epoxy group in one molecule and a compound having both of an epoxy group and a (meth) acryloyl group in one molecule are preferred.

In order to raise the hardness, the compound having two or more epoxy groups in one molecule is preferred, and in order to adjust the viscosity and other physical properties, the compound having one epoxy group in one molecule is preferred.

Preferred examples of the compound having two or more epoxy groups in one molecule, of which include diepoxy compounds of bisphenols and their hydrides, novolac type epoxy compounds and their hydrogenated derivatives, diepoxy to polyepoxy compounds of aromatic amines, and other bifunctional to polyfunctional epoxy compounds. The epoxy compounds are not limited to them.

Phenyl glycidyl ether, butyl glycidyl ether, etc. are recited as preferred examples of the compound having one epoxy group in one molecule. However, the organic epoxy compound is not limited to the above.

Preferred examples of the polymer having two or more epoxy groups in one molecule, of which include polymers obtained by polymerizing glycidyl acrylate, glycidyl methacrylate, 3,4-epoxycyclohexyl acrylate, 3,4-epoxycyclohexyl methacrylate, 3,4-epoxycyclohexylmethyl acrylate, or 3,4-epoxycyclohexylmethyl methacrylate component as a main component. The polymer is not limited to them.

As preferred examples of the compound having both of the epoxy group and the (meth)acryloyl group in one molecule, glycidyl acrylate, glycidyl methacrylate, 3,4-epoxycyclohexyl acrylate, 3,4-epoxycyclohexyl methacrylate, 3,4-epoxycyclohexylmethyl acrylate, 3,4-epoxycyclohexylmethyl methacrylate, polymers obtained by polymerizing them as a main component and partially added with (meth)acrylic acid, etc. The compound is not limited to them.

Although the content of (G) can be appropriately determined depending upon its kind, the content is preferably at most 30 weight percent, and more preferably 0 to 20 weight percent of the total amount of the polymerizable components (A) and (B).

(H) Organic Oxetane Compound

As preferred examples of the organic oxetane compounds, a series of oxetane compounds available from Toagosei Co., Ltd. (for example, EXOA or its derivative, XDO), a polymer having an oxetane group at its side chain as disclosed in JP-A 2001-40205, etc. can be used. However, the organic oxetane compound is not limited to them.

Although the content of (H) can be appropriately determined depending upon its kind, the content is preferably at most 30 weight percent, and more preferably 0 to 20 weight percent of the total amount of the polymerizable components (A) and (B).

Into the composition according to the present invention can be further incorporated at least one kind selected from the group of an ultraviolet absorber (I), a hindered amine type stabilizer (J), an antistatic agent (K), a slipping agent (L), an anti-clouding agent (M) and a releasing agent (N).

For example, mixing of the ultraviolet absorber (I) or the hindered amine-type stabilizer (J) is preferable in some cases, because the weatherability is remarkably improved.

As preferred examples of the ultraviolet absorber (I), benzotriazole-type, benzophenone-type, salicylic acid-type, cyanoacrylate-type, and triazine-type ultraviolet absorbers, etc. can be used.

As the hindered amine type light stabilizer (J), N-methyl forms such as SANOL LS765, etc. are preferred, but ordinary N—H forms such as LS-770, etc. can be used.

The respectively preferred mixing rates vary depending upon the required weatherability level, but in many cases (J) is preferably 0.5 to 30 parts by weight, and more preferably 1 to 10 parts by weight relative to 100 parts by weight of the total amount of (A) to (H).

In order improve the physical properties of the coated film, the composition of the present invention may be mixed with various additives such as an antioxidant (for example, a hindered phenol-type, sulfur-type, phosphorus-type antioxidant, etc.), anti-blocking agent, slipping agent, a leveling agent, etc. which would be incorporated into such a kind of the antifouling agent. In this case, the mixed amount is preferably 0.01 to 2% by weight.

Further, it is preferable to use the same solvent as used in the production of (A-F) so as to adjust the viscosity of the composition.

Preferred compositional examples of the composition according to the present invention will be explained.

The total amount of the above (Bi) and (Bii) is ordinarily 0 to 20000 parts by weight relative to 100 parts by weight of the organic polymer (A), and preferably the total amount of the (Bi) and (Bii) is at least 500 parts by weight relative to 100 parts by weight of the (A). When the total amount is set at least 500 parts by weight, the hardness can be further raised, and the curing shrinkage can be reduced to further suppress warping. However, in order to more effectively exhibit the easy-coating and the effects of (A), it is preferable to suppress the total amount of the above (Bi) and (Bii) to at most 10000 parts by weight relative to 100 parts by weight of the (A). Furthermore, ordinarily, (Bi) is set at preferably at least 30% by weight, and more preferably at least 50% by weight relative to the total amount of (Bi) and (Bii).

A part of (A) may be replaced by (Ai). Ordinarily, (A) is set preferably at least 80% by weight, and more preferably at least 90% by weight relative total amount of (A) and (Ai).

However, when the composition is used in a hard coat layer of a laminate for an optical display, it is preferable that the amount of (Ai) is more than the amount of (A). For example, (Ai) is set at preferably 80% by weight, and more preferably 90% by weight relative to the total amount of (A) and (Ai).

The total amount of the cation polymerization photo initiator (C) and the radical polymerization photo initiator (D) is set at preferably at least 0.5 part by weight, and more preferably at least 1 part by weight relative to 100 parts by weight in the total amount of (A), (Ai), (Bi) and (Bii). If the above total amount is set at least 0.5 parts by weight, higher hardness can be obtained. Although the upper limit is not particularly specified, it is ordinarily set at most 20 parts by weight, and preferably at most 10 parts by weight.

With respect to 100 parts by weight in total amount of (A), (Ai), (Bi) and (Bii), the total amount of the radical polymerizable organic (meth)acrylate compound and/or the radical polymerizable organic (meth) acrylamide compound (E), the radical polymerizable polymer (F), the organic epoxy compound (G) and the organic oxetane compound (H) is preferably at most 70 parts by weight, and more preferably at most 30 parts by weight.

With respect to 100 parts by weight in total amount (A), (Ai), (Bi) and (Bii), the total amount of the ultraviolet absorber (I), the hindered amine-type light stabilizer (J), the antistatic agent (K), the slipping agent (L), the anti-clouding additive (M), and the releasing agent (N) is preferably at most 30 parts by weight, and more preferably at most 10 parts by weight.

Further, a part of (A) and (Ai) can be replaced by (F) or (G). Furthermore, a part of (Bi) and (Bii) can be replaced by (E). However, in order to maintain the hardness, the total amount of (E), (F) and (G) is set preferably at most 30 parts by weight relative to 100 parts by weight in total amount of (A), (Ai), (Bi) and (Bii).

The cured product obtained by polymerizing the composition of the present invention through irradiation with the active energy rays has excellent characteristics such as antifouling property, hardness, etc.

The article, which has, on the surface, a film polymerized by irradiating the composition of the present invention with active energy rays, possesses excellent characteristics such as antifouling property, hardness, etc. It may be that after the composition is coated onto the surface of the article, it is polymerized by irradiation with the active energy rays or it may be that after a film polymerized by irradiation with the active energy rays is separately formed, the film is laminated on the article.

The coating method is not particularly limited, and a dip coating method, flow coating method, a spin coating method, a spray coating method, a bar coating method, a gravure coating method, a roil coating method, a blade coating method, an air knife coating method, etc. can be illustrated as preferred examples.

After the composition, is coated onto the substrate and the coated film is obtained by removing the solvent through drying, the cured film is obtained by polymerization through irradiation with the active energy rays.

The kind, the source and the irradiating method of the active energy rays are not particularly limited. Ultraviolet rays emitted from light sources such as a xenon lamp, a low-pressure mercury lamp, a high-pressure mercury lamp, an ultrahigh-pressure mercury lamp, a metal halide lamp, a carbon-arc lamp, a tungsten lamp and the like, and electron beam, $\alpha$ rays, $\beta$ rays, $\gamma$ rays or the like taken out of a particle accelerator at ordinarily 20 to 2000 kV, can be used. The ultraviolet ray can be favorably used from the viewpoint of easy-handling and no need of a complicated equipment. The cured film has an excellent balance in processability and the physical properties.

In the following, "curing" means curing by irradiation with the active energy rays. Unless otherwise specified, curing is performed in an atmosphere having an ordinary concentration of oxygen.

The thickness of the film (hereinafter referred to as cured film) obtained by coating, polymerizing and curing may be appropriately selected depending upon the purpose, and is not particularly limited. The composition according to the present invention is excellent in that it can realize both the thinning and thickening of the film. For example, the film thickness may be at least 5 µm or at most 2 µm. Preferably, the film thickness after curing is at least 0.01 µm. This is because the antifouling property and the hardness are sufficiently obtained. The film thickness is more preferably at least 0.04 µm, and more preferably at least 0.1 µm. When importance is placed particularly on the hardness, it is preferably at least 0.5 µm, and more preferably at least 1 µm. However, the film thickness is preferably at most 200 µm. For, too much thickness tends to decrease the hardness of the film, and warping and distortion due to the shrinkage on curing is to be suppressed. It is more preferably at most 100 µm, and further preferably at most 50 µm.

The cured product which is obtained by polymerizing and curing the composition of the present invention with the active energy rays (including the film formed on the article) preferably meets the following physical properties.

1) Pensile Hardness

It is preferable that when a film is cured after the composition according to the present invention is coated on a PET film having a thickness of 100 µm such that the thickness of the cured film will be 5 µm, the film preferably gives a pensile hardness of HB or more. More preferably, the pensile hardness is F or more. The pensile hardness is in the order of 6B, 5B, - - - B, HB, F, H, 2H, 3H, - - - 9H successively from a soft side. Meanwhile, in the present invention, an adhesive film (a film that shows good adhesion with an ultraviolet ray curable resin) is used as the PET film.

In the case of the composition containing the organic/inorganic composite (Bi), it is preferable that the pensile hardness of a cured film which is cured after the composition is applied on a 100 µm-thick PET film such that it will give a cured film thickness of 10 µm is 3H or more.

2) Contact Angle

When a cured film is obtained by curing after a composition having a greater content of (A) in the total amount of (A) and (Ai) is applied on a 100 µm PET film such that it will give a cured film thickness 0f 5 µm, the contact angle of the surface of the film to water is preferably at least 100 degrees. Further, the contact angle to hexadecane is preferably at least 40 degrees. On the other hand, it is preferable that when a cured film is obtained after a composition which has a greater content of the organic polymer (Ai) is applied on a 100 µm-thick adhesive PET film such that it will give a dried film thickness of 5 µm, the contact angle of ace the cured film to water is at least 90 degree and that the contact angle to hexadecane is at most 20 degrees.

3) ESCA

When a cured film is obtained by applying the composition of the present invention on a 100 µm-thick PET film such that it will give a cured film thickness of 5 µm, its content of antifouling groups at a position of a depth of 3 nm from the surface of the film, is preferably at least 3 times the average content of the antifouling groups in the whole film. That is, it is preferable that the antifouling groups exist at a specifically higher content in the surface of the film. This construction is one of the features of the composition according to the present invention. As a result, the content of the antifouling groups is greater in the surface of the coated film, even if the content of the antifouling groups in the composition is low. Therefore, the film has excellent antifouling property . The content of antifouling groups at a position of a depth of 3 nm from the surface of the film is more preferably at least 3.2 times, and more preferably at least 3.5 times. But, the content is ordinarily at most 100 times.

In the present invention, the antifouling group means an antifouling group such as a perfluoroalkyl group, a polysiloxane, a long-chain alkyl group having at least 12 carbon atoms, etc. The average content of the antifouling groups in the whole film, can be calculated from the average proportions of the composition, for example. The content of the antifouling groups in the film can be determined by measurement with an X ray photoelectron spectrometry (hereinafter referred to as ESCA), for example. That is, the ratio in the numbers of atoms in a range of 3 nm from the surface has only to be determined by using the ESCA. For example, the content of the antifouling groups can be determined by measuring the F/C ratio in the case of using the perfluoroalkyl groups or the Si/C ratio in the case of using the polysiloxane groups, or by calculating the ratios of all atoms contained in the case of using the long-chain alkyl groups in detail.

4) Curability

In case that the composition according to the present invention is applied on a 100 μm-thick PET film such that it will give a cured film thickness of 0.5 μm and the applied composition is irradiated with ultraviolet ray, curing preferably advances up to a completely tack-free state with an UV irradiant level of 300 mJ/cm$^2$. When the composition is applied such that it will give a cured film thickness of 2 μm, curing preferably advances up to a completely tack-free state with an UV irradiant level of 150 mJ/cm$^2$.

5) Curl Amount

When a cured film is formed through applying the composition of the present invention on a 100 μm-thick PET film such that it will give a cured film thickness of 5 μm and curing it in an atmosphere having an ordinary concentration of oxygen, a warped amount of the cured film is preferably at most 10 mm. It is more preferably at most 2 mm, and further more preferably at most 1 mm.

6) Abrasion Resistance

When a cured film is formed by applying the composition according to the present invention on a 100 μm thick PET film such that it will give a cured film thickness of 5 μm and curing it in the atmosphere having the ordinary concentration of oxygen, the abrasion resistance of the cured film is preferably at most 25.0.

7) Haze Value

When a cured film is formed by applying the composition of the present invention on a 100 μm thick PET film such that it will give a cured film thickness of 5 μm and curing it, the haze value of the cured film is preferably at most 1.5%.

8) Fingerprint Resistance

When a fingerprint or an artificial fingerprint liquid is attached onto a surface of a cured body or a cured film obtained by using the composition according to the present invention and it is wiped off with a tissue paper under a load of 200 g, it is preferable that the fingerprint can be completely removed by wiping-off within three-time reciprocating movements. It is more preferably within twice reciprocating movements. The surface characteristic of the excellent fingerprint-removability is one of the features of the composition according to the present invention. In this case, a mixture of triolein/JIS Z8901 (testing powder) No. 11 (Kanto loam dust)/methoxy propanol=1/0.4/10 (weight ratio) is used as the artificial fingerprint liquid.

9) Durability of Fingerprint Resistance

It is preferable that the fingerprint removability does not drop even by repeating the wiping-off operations 20 times after the fingerprint or the artificial fingerprint liquid is attached and reciprocating movements are done with a tissue paper three times under a load of 200 g. The composition according to the present invention has high hardness after being cured, and the antifouling groups are fixed inside the polymer, and thus prevented from being removed from the surface of the film. For this reason, even when the wiping-off operations are repeated a dozen times, it is possible to prevent phenomena that fine scratches are formed on the surface to allow permeation of stain thereinto and that the antifouling agent is lost from the surface. Thus, the durability of the antifouling property is high. It is more preferable that even when the above operations are repeated 40 times, the fingerprint removability does not drop.

Although the conventional fingerprint resisting agent for the optical recording media and the optical displays generally has excellent attachment resistance due to a low stain attachment amount and a small stain drop size, the agent exhibits too high slippery characteristic on wiping off or has insufficient hardness. Thus, the stain is likely to be spread on the surface, and there is a tendency that the stain cannot be removed unless the number of times of wiping operations is increased. Since the composition according to the present invention has high hardness after being cured and does not possess excess slipping property, it has the advantage that the stain can be removed at a smaller number of times of wiping-off operations.

In the following, the articles having the cured films of the present invention will be explained.

The cured films of the present invention can be applied to various articles. For example, illustration can be made of optical recording media, optical displays, transparent films used in agricultural applications (plastic green houses) (requiring antifouling function for the necessity of effectively taking in sunlight), surface-protective transparent films for solar cells (requiring the antifouling function for preventing reduction in cell efficiency), transparent films for protecting surfaces of reflecting layer on signs (requiring transparency and antifouling function for facilitating visualization of letters of the signs even with a headlamp light or a relatively dark brightness of an external light), optical lenses, optical prisms, prism sheets, automobile window parts, building window parts, glass lenses, etc. Particularly, the composition is preferably applied to optical articles requiring high transparency.

The composition according to the present invention forms hard coating layers by applying it on various substrates, drying and curing it. Although the kind of the substrate is not particularly limited, substrates made of resins are preferred from the viewpoint of high adhesion, etc. The resin substrate may be any of a planar shape, a sheet shape or a filmy shape, or a molded product having any shape. Further, the substrate may be a part of a laminate, or other layer may be interposed between the substrate and the cured film.

The resin substrate may be of a thermoplastic resin or of a curable resin cured with heat or active energy rays.

As the thermoplastic resin, mention may be made of, for example, polyesters such as polyethylene terephthalate (PET), polyethylene naphthalate, etc., polymethyl methacrylate (PMMA), methyl methacrylate (MMA)-containing copolymers (methyl methacrylate-styrene copolymer resin (MS resin)), polycarbonate (PC), triacetyl cellulose, acrylonitrile-butadiene-styrene copolymer (ABS resin), modified polyolefin resin, fluorocarbon polymer, (for instance, polyvinylidene fluoride (PVDF), polyvinyl fluoride resin (PVF) resin, etc.), hydrogenated polystyrene resin, cycloolefin derived resin (for example, ARTON manufactured by JSR Corporation, ZEONEX and ZEONOR manufactured by ZEON Corporation, APEL manufactured by MITSUI CHEMICALS, Inc.), etc.

As the curable resin, illustration can be made of, for example, curable materials such as epoxy resin, urethane resin, thermosetting and photo curable acrylic resins, curable materials such as thermosetting and photo curable organic/inorganic hybrid resins, etc. and the like.

For example, these substrates may be films themselves formed by coating, or molded products obtained by various molding methods.

Since the cured film of the present invention is excellent in transparency, antifouling property and hardness, it exhibits large effects when applied to optical articles requiring high transparency. In this case, when the substrate is also required to be transparent, the substrate is desirably formed by any of a coating method, a melt-extrusion molding method or a solvent casting method. When the substrate contains functional groups which are curable with the active energy rays or heat, it is preferable in some cases that the substrate is cured by irradiation with the active energy rays or heat. In order to increase the hardness of the substrate or to reduce shrinkage on curing, the substrate preferable contains the inorganic oxide fine particles and/or urethane acrylate. Transparency generally means that the transmittance of light at an intended wavelength is at least 80%.

The cured film according to the present invention can be also favorably used as an antifouling hard coat layer for the optical recording medium. The optical disc is typical of the optical recording medium, and the kind may be any of a phase-change type, a pigment type, a magneto-optical type, a ROM type, etc. Among them, high density recording optical discs such as DVD, HD DVD, BLU-RAY™ discs, etc. are intended. Since the recording mark and the beam spot of the laser beam for writing/reading become smaller so as to increase the recording density, the disc is susceptible to stain or scratch. Consequently, it is likely that the jitter rises or writing/reading errors are likely to increase. Thus, the hard coat layer having excellent antifouling property and hardness is sought.

A preferred construction is an optical recording medium which has a multilayer film with at least a recording layer or a refractive layer on a substrate and which has the cured film of the present invention at least on the outermost surface at a radiation-incident side of the optical recording medium. When the stain or scratch is present on the outermost surface at the radiation-incident side, the beam for writing/reading is interrupted to cause errors. Therefore, the cured film of the present invention is preferably provided, as an antifouling hard coat layer, on the outermost surface at the radiation-incident side. For example, there are two cases: (1) like the BLU-RAY™ discs, etc., the radiation-incident surface is present at a side opposite to the substrate with respect to the recording layer or the reflective layer, and (2) like the DVD, etc., the side of the substrate is at the radiation-incident face with respect to the recording layer or the reflective layer. In this case, the hard coat layer needs to be optically transparent. The optical transparency ordinarily means the state that the transmittance is at least 80% for the beam having the writing/reading wavelength. The cured film of the present invention may be provided on an outermost surface at a side opposite to the radiation-incident side.

Preferred layer constructions of the optical recording media will be explained.

(1) Optical recording medium in which a surface at a side of a multilayer is designed as a surface at a writing/reading beam-incident side. A preferred layer construction of such an optical recording medium is that (a reflective layer) a recording layer and a hard coat layer (cured film) are provided on a substrate in this order. More preferably, the optical recording medium has an optical transparent layer between the recording layer or the like and the hard coat layer. The provision of the optical transparent layer is preferable, because the space between the outermost surface at the radiation-incident side and the recording layer (reflective layer) is enlarged, and the writing/reading beam is less likely be susceptible to a stain or scratch at the surface of the medium. The thickness of the optical transparent layer is preferable at least 30 μm, and more preferably at least 70 μm. Further, the thickness of the optical transparent layer is preferably at most 200 μm, and more preferably at most 150 μm.

Any optional layer may be provided between the layers depending upon the purpose. For example, inorganic protective layers made of a dielectric material or the like may be provided on upper and lower side of the recording layer. Or, in order to raise the recording capacity, multiple-recording layers or reflective layers may be provided via an optical transparent spacer layer. The optical transparent spacer layer is provided to prevent mixing of signals between the multiple-recording layers. The film, thickness is preferably the same as that of the optical transparent layer.

Particularly preferable examples of the layer construction are constructions such as substrate/reflective layer/inorganic protective layer/recording layer inorganic protective layer/optical transparent layer/hard coat layer, and substrate/reflective layer/optical transparent layer/hard coat layer, constructions such as substrate/reflective layer/inorganic protective layer/recording layer/inorganic protective layer/optical transparent spacer layer/reflective layer/inorganic protective layer/recording layer/inorganic protective layer/optical transparent layer/hard coat layer, substrate/inorganic protective layer/recording layer/inorganic protective layer/optical transparent layer/hard coat layer, etc. However, the construction is not limited to them.

Materials for the substrate, the recording layer, the reflective layer and the inorganic protective layer are not particularly limited, and any of publicly known materials for the optical recording media can be used.

As the substrate, resins such as polycarbonate, polyacrylate, polyolefin, etc. glass or the like can be used. When the writing/reading beam enters from the side of the substrate, the substrate needs to be transparent to the writing/reading beam. The thickness of the substrate is ordinarily 0.3 to 1.2 μm. The substrate is often formed with grooves or pits.

The recording layer is of the phase-change type, the pigment type, the photo electro-magnetic type or the like. In the case of the ROM only use type, it may have no recording layer in some cases. A chalcogen-based alloy is often used in the phase-change type recording layer. For instance, GeSbTe system alloys, InSbTe system alloys, GeSnTe system alloys, and AgInSbTe system alloys are illustrated. The thickness of the phase-change recording layer is ordinarily 3 nm to 50 nm. In the pigment type recording layer, an azo-type dye, a cyanine-type dye, phthalocyanine-type dye, porphyrin-type dye, etc. can be used. But, the pigment type recording layer is not limited thereto. The thickness of the pigment type recording layer is ordinarily 50 nm to 10 μm.

The material for the inorganic protective layer is determined in consideration of refractive index, heat conductivity, chemical stability, mechanical strength, adhesion, etc., and dielectric material is ordinarily used. As the material for the inorganic protective layer, use is made of oxides, sulfides, oxysulfide and nitride of metals or semiconductors or fluorides of Ca, Mg, Li, etc. as ordinarily having high transparency and high melting points. The thickness of the inorganic protective layer is ordinarily around 5 to 200 nm.

The reflective layer is preferably made of a material having large reflectance and heat conductivity. As the material having large reflectance and heat conductivity, metals composed mainly of Ag, Au, Al, Cu or the like are recited. Among them, Ag has larger reflectance and heat conduction as compared with Au, Al and Cu. Into them, may be incorporated around 5 atom % of elements such as Cr, Mo, Mg, Zr, V, Ag, In, Ga, Zn, Sn, Si, Cu, Au, Al, Pd, Pt, Pb, Ta, Ni, Co, O, Se, V, Nb, Ti, O, N, etc. The thickness of the reflective layer is ordinarily 30 to 200 nm. The reflective layer may be a so-called semi-reflective layer.

The optical transparent layer and the optical transparent spacer layer have only to be optically transparent and have a given thicknesses, but their materials or forming methods are not particularly limited. Ordinarily, a resin composition is used. Typically, they are formed by the following two methods. The first method is a method in which after a curable resin composition is applied by a spin coating method, a film is formed by curing it with light or heat. When urethane acrylate is incorporated in this case, the surface hardness and scratching resistance can be improved, while warping due to curing shrinkage is being suppressed. Further, from the viewpoint of improving the surface hardness and the scratch resistance, it is preferable that the inorganic oxide fine particles of such as colloidal silica are incorporated in such a range as not damaging the optical transparency. The second method is that a film prepared by a solvent casting method, a melt extrusion molding method or the like is attached directly or via an adhesive. At this time, in order to further improve the surface hardness and the scratching resistance, it is preferable to incorporate the inorganic oxide fine particles of such as colloidal silica in such a range as not damaging the optical transparency. Grooves or pits may be formed in the optical transparent spacer layer.

The method for forming the hard coat layer made of a cured film of the composition according to the present invention will be explained. It is a common method in which the composition is applied on the above-mentioned layer by the spin coating method or the like, and a cured membrane is formed by polymerizing the composition through irradiation with the active energy ray. Alternatively, a method is also preferable, in which the composition is applied on a releasable film, a film is formed by polymerizing and curing the composition through the irradiation with the active energy rays, then a side of the film is attached to an optical recording medium directly or via an adhesive, and the film is released to form a hard coat layer. Further, it is also a preferred method that the composition according to the present invention is applied to a film prepared by a solvent casting method or a melt extrusion method or the like, then the composition is polymerized to a cured film by the irradiation with the active energy rays, and the cured film is attached onto the optical recording medium directly or via an adhesive, thereby simultaneously forming the optical transparent layer and the hard coat layer.

As the optical recording medium having such a layer construction, there are BLU-RAY™ discs, etc.

(2) Optical Recording Medium of which Surface on a Side of the substrate is Designed as a Surface at a Writing/Reading Beam-Incident side A preferred layer construction of such an optical recording medium has a recording layer (reflective layer) on one surface of the substrate and a hard coat layer on the other surface of the substrate in this order. The writing/reading beam enters the recording layer and the reflecting layer via the hard coat layer and the substrate. An optical transparent layer may be provided between the substrate and the hard coat layer.

An arbitrary layer may be provided between the layers, depending on the purpose. For example, inorganic protective layers made of a dielectric material or the like may be provided on upper and lower sides of the recording layer. Further, in order to increase the recording capacity, plural set of the recording layers and the reflective layers may be provided via the optical transparent spacers.

As particularly preferred examples of the layer construction, illustration is preferably made of constructions of hard coat layer/substrate/inorganic protective layer/recording layer/inorganic protective layer/reflective layer, hard coat layer/substrate/reflective layer, constructions of hard coat layer/substrate/inorganic protective layer/recording layer/inorganic protective layer/reflective layer/optical transparent spacer layer/inorganic protective layer/recording layer/inorganic protective layer/reflective layer, hard coat layer/optical transparent layer/substrate/inorganic protective layer/recording layer/inorganic protective layer/reflective layer, etc. But, the construction is not limited to them.

The material and the thickness of each layer are preferably the same as in (1).

As the optical recording media having such layer constructions, there are various kinds of DVDs such as DVD±R, DVD±RW, DVD-RAM, etc. (including DVDs with multiple recording layers) and HD DVD.

As the method for the formation of the hard coat layer in the present construction, it is a common method that after the composition of the present invention is applied onto the substrate or the like by the spin coating method or the like, a film is formed by polymerization and curing through irradiation with the active energy rays.

The composition of the present invention can be favorably used for applications of the optical displays. Particularly, the composition can be preferred as the antifouling agent for surfaces of display panels of flat displays (liquid crystal displays, plasma displays, rear projection displays, front projector screens, inorganic EL displays, organic EL displays, etc.). Among them, the composition can be favorably used as hard coat layers surfaces of displays having touch panel input function in car navigation systems, cellular phones, mobile information terminals (PDA, etc.), PC monitors, etc.

When the composition of the present invention is applied to the laminate to be used in such a display, it is preferable that a transparent resin substrate is used, and a cured film is formed on at least one outermost surface of the laminate by polymerizing this composition through irradiation with the active energy rays.

The cured which is polymerized by irradiating the composition the present invention with the active energy rays, has excellent characteristics such as antifouling property, hardness, etc.

The article, which has the film polymerized on the surface by irradiating the composition of the present invention with the active energy rays, has excellent characteristics such as antifouling property, hardness, etc. After the composition is coated on the surface of the article, it may be polymerized by irradiating with the active energy rays, or a film polymerized by irradiating with the active energy rays may be laminated on the article.

EXAMPLES

In the following, the present invention will be explained in more detail by illustrating examples. Materials, use amounts, ratios, processing contents, processing procedures, etc. shown in the following examples can be appropriately changed, provided that such changes do not depart from the purpose of the present invention. Therefore, the scope of the present invention is not limited to the examples shown below.

"Part" and "%" in Examples mean "part by weight" and "weight percent", respectively.

Evaluation methods of general physical properties of coated films in the examples, etc. were shown below.

(1) Transparency: Evaluated by the haze value according to the condition of JIS K-7105.

(2) Pensile Hardness:

Measurement was made by JIS-compliant pensile hardness meter (manufactured by Taiyu Kizai Co., Ltd.) according to the condition of JIS K-5400, and the pensile hardness was indicated by the hardest pensile count which formed no scratch.

(3) Contact Angle to Water:

Pure water, 0.002 ml, was dropped on a coated film, and a contact was measured one minute later. A P type contact angle measuring instrument manufactured by Kyowa Science Co., Ltd.) was used to measure the contact angle (Unit: degree).

(4) Coating Adhesion:

Coated adhesion was tested by a cross-cut adhesion method described in JIS K 5400. Here, 100 grid squares were formed at an interval of 1 mm, and tests were performed with cellophane tapes (Nichiban Co., Ltd.). An evaluation method was that the same operations were repeated five times (Every time, a new cellophane tapes was used), and measurements and evaluations were performed according to a method in which ○ indicated samples that suffered completely no scratch or peeling, Δ indicated samples that each suffered scratches or peeling in at most 10% of the grid squares, and x indicated the remainder.

(5) Fingerprint Wiping-Off Property (1-1):

A nose fat in place of a sebum was attached to a thumb, and the thumb was pushed vertically on a coating film for 3 seconds, thereby forming a fingerprint on the coated film. The fingerprint was lightly wiped five times with a tissue paper (manufactured by Crecia Co., Ltd.), and the number of times of reciprocating movements until when no fingerprint was visually observed from a distance of 15 cm was taken as the fingerprint wiping-off property (1-1).

(6) Fingerprint Wiping-Off Property (1-50):

The same operations as in the above fingerprint wiping-off property (1-1) were repeated on the same coated film 50 times. After that, the fingerprint was lightly wiped with a tissue paper (manufactured by Crecia Co., Ltd.), and the number of times of reciprocation movements until when no fingerprint was visually observed from a distance of 15 cm was taken as the fingerprint wiping-off property (1-50).

If the fingerprint wiping-off property (1-1) and that (1-50) had the same number of times of the reciprocating movements, shows that the coated film has excellent durability of repetition of the wiping-off operations of the fingerprint.

(7) Fingerprint Wiping-Off Property (2):

After the surface of a coated film was reciprocatedly rubbed 100 times with an eraser, evaluation was performed in the same manner as in the above fingerprint wiping-off property (1-1).

(8) Durability of Fingerprint Wiping-Off Under a High Load:

A nose fat in place of a sebum was attached to a thumb, and the thumb was pushed on a coating film for 3 seconds, thereby forming a fingerprint on the film. The fingerprint was wiped reciprocatedly 3 times with a tissue paper (manufactured by Crecia Co., Ltd.) in which a 200 g weight is rolled. This operation was repeated 20 times. After that, if the fingerprint was not visually observed from a distance of 15 cm, it was judged ○, whereas if the fingerprint was visually observed from the distance of 15 cm, it was judged x. This test is a durability test under a higher load as compared with (6).

(9) Attachment Resistance to Artificial Fingerprint Liquid:

A mixture of triolein/JIS Z8901 (testing powder) No. 11 (Kanto loam dust)/methoxy propanol=1/0.4/10 (weight ratio) was used as the artificial fingerprint liquid. This is a liquid adapted in the evaluation of the fingerprint resistance for the next-generation optical discs.

The artificial fingerprint liquid was applied onto a polycarbonate substrate at 3000 rpm by spin coating, and an artificial fingerprint liquid master was prepared by drying at 60° C. for 3 minutes. A smaller-diameter end face of a silicone rubber plug (No. 1) was uniformly roughened with a polishing paper #240, thereby obtaining a transfer piece.

The transfer piece was pushed onto the master under a constant load of 4.9 N for 10 seconds, and thereafter pushed onto a surface of the coated film under the constant load of 4.9 N. This is taken as Operation L1.

After the operation in which the transfer piece was pushed on the master under the constant load of 4.9N for 10 seconds was continuously repeated n times, the transfer piece was pushed on the surface of the coated film under the constant load of 4.9N. This is taken as Operation Ln.

The attachment diameter of the artificial finger liquid on the surface of the coated film after each of the Operations was visually observed by a microscope having a ×100 magnification with a scale, Operation Ln in which n was the maximum within the maximum attachment diameter of at most 20 μm was taken the artificial fingerprint liquid attachment resistance.

The artificial fingerprint liquid attachment resistance is preferably L3 or L4, and more preferably L4.

(10) Artificial Fingerprint Wiping-Off Property (1-1):

Operation L4 in the evaluation of (9) Artificial fingerprint liquid attachment resistance was performed. The artificial fingerprint liquid attached on the surface of the coated film was lightly wiped with a tissue paper (manufactured by Crecia Co., Ltd.), and the number of times of reciprocating movements until when the artificial fingerprint was not visually observed from a distance of 15 cm was taken as the artificial fingerprint liquid wiping-off property (1-1).

(11) Artificial Fingerprint Liquid Wiping-Off Durability:

Operation L4 in the evaluation of the artificial fingerprint liquid attachment resistance of was performed, and the artificial fingerprint liquid attached to the surface of the coated film was wiped reciprocately three times with a tissue paper (manufactured by Crecia Co., Ltd.) in which the 200 g weight is warped. This operation was performed 20 times. After that, if the fingerprint was not visually observed from a distance of 15 cm, it was judged ○, while if the fingerprint was visually observed from the distance of 15 cm, it was judged x.

(12) Evaluation of Slipping Property (Evaluation of Plane/Plane Slipping Property):

A coefficient of kinetic friction between surfaces of coated films was determined by the method according to JIS K-7125. If the coefficient of kinetic friction determined by this method is at most 0.2, the slipping property is high, whereas if the coefficient of kinetic friction is at most 0.5, the slipping property is recognizable. If that coefficient of kinetic friction is at least 1.0, the slipping property is low. It is preferable that the slipping property is not too high,

(13) Wiping-Off Feeling:

Slip feeling the surface was evaluated when the fingerprint wiping-off property was evaluated. Large slip feeling was judged ○, small slip feeling was Δ, and no slip feeling x, This evaluation differs from the evaluation of slipping property of (12) in that that face of the tissue paper which contacts the coated film is not smooth, and a slipping effect due to the uneven surface largely contributes.

In order to satisfy all of the attachment resistance, the wiping-off property and the wiping-off durability of the fingerprint and/or the artificial fingerprint liquid, it is desired that the evaluation of the wiping-off feeling in (13) is ○, and the coefficient of kinetic friction between the coated surfaces in the evaluation of the slipping property of (12) is at least 1.0.

Synthesis of Organic Polymers

Synthesis Example 1

Synthesis of an Organic Polymer (a-1) within the Scope of the Present Invention

Perflurooctylethyl methacrylate 10 g, 60 g of methyl methacrylate, 1 g of α,ω-dimercaptopolydimethylsiloxane (Number average molecular weight: 1600), 30 g of CYCLOMER M100 (3,4-epoxycyclohexylmethyl methacrylate, manufactured by Daicel Chemical Industries Ltd.), and 200 g of methyl ethyl ketone (MEK) were mixed, and thereafter the internal temperature was raised to about 60° C., in a nitrogen stream. The ratio of mercapto group to epoxy group (mol/mol) was 0.008. Then, 2,2'-azo(2,4-dimethylvaleronitrile) (manufactured by Wako Pure Chemical Industries, Ltd., V65) was added in twice in a total amount of 1.5 g, and stirring was continued at 65° C. for 6 hours. Subsequently, the internal temperature was raised to 80° C. to completely inactivate the V65. Thereafter, the internal mixture was returned to room temperature, thereby obtaining a reaction product containing an organic polymer (a-1). The solid content was about 34%.

Synthesis Example 2

Synthesis of an Organic Polymer within the Scope of the Present Invention

Perfluorooctylethyl methacrylate 18 g, 50 g of methyl methacrylate, 2g of α,ω-dimercaptopolydimethylsiloxane (Number average molecular weight 1600), 30 g glycidyl methacrylate, and 200 g of PGM (propylene glycol monomethyl ether) were added, and the internal temperature was raised to about 60° C., in a nitrogen stream. The ratio of mercapto group to epoxy group (mol/mol) was 0.012. Then, V65 was added in twice in a total amount of 1.5 g, and stirring was continued at 65° C. for 6 hours. Subsequently, the internal temperature was raised to 80° C. to completely inactivate the V65, and then the internal mixture was returned to room temperature, thereby obtaining a reaction product containing an organic polymer (a-2). The solid content was about 34%.

Synthesis Example 3

Synthesis of an Organic Polymer (a-3) within the Scope of the Present Invention

After the reaction product containing the organic polymer (a-2) obtained in Synthesis Example 2 was heated at 90° C. in the air atmosphere, 0.1 g of p-methoxyphenol and 0.5 g of triphenyl phosphine were added. Five minutes later, 15.2 g of acrylic acid was dissolved in 50 g of PGM, and the solution was dropped in 30 minutes. During being dropped, the liquid temperature was kept at 90 to 105° C. Then, the liquid temperature was raised to 110° C., and this temperature was kept for 8 hours. Thereafter, the temperature was returned to room temperature, thereby obtaining a reaction product containing an organic polymer (a-3). The solid content was 33%.

Synthesis Example 4

Synthesis of an Organic Polymer (a-4) within the Scope of the Present Invention

Perfluorooctylethyl methacrylate 20 g, 20 g of methyl methacrylate, 3of α,ω-dimercaptopolydimethylsiloxane (Number average molecular weight 1600), 60 g of CYCLOMER A400 (3,4-epoxycyclohexylmethyl acrylate, manufactured by Daicel Chemical Industries, Ltd.) and 200 g of MEK were added, and the internal temperature was raised to about 60° C., while nitrogen was flown. The ratio of mercapto group to epoxy group (mol/mol) was 0.011. Then, V65 was added in twice in a total amount of 1.5 g, and stirring was continued at 65° C. for 6 hours. Subsequently, the internal temperature was raised to 80° C. to completely inactivate the V65, and then the internal mixture was returned to room temperature, thereby obtaining a reaction product containing an organic polymer (a-4). The solid content was about 34%.

Synthesis Example 5

Synthesis of an Organic Polymer (a-5) within the Scope of the Present Invention

Perfluorooctylethyl methacrylate 18 g, 50 g of methyl methacrylate, 0.2 g of α,ω-dimercaptopolydimethylsiloxane, (Number average molecular weight 1600), 30 g of CYCLOMER A400 (manufactured by Daicel Chemical Industries Ltd.) and 200 g of PGM were added, and the internal temperature was raised to about 60° C., in a nitrogen stream. The ratio of mercapto group to epoxy group (mol/mol) was 0.0015. Then, V65 was added in twice in a total amount of 1.5 g, and stirring was continued at 65° C. for 6 hours. Subsequently, the internal temperature was raised to 80° C. to completely inactivate the V65, and then the internal mixture was returned to room temperature, thereby obtaining a reaction product containing an organic polymer (a-5). The solid content was about 34%.

Synthesis Example 6

Synthesis of an Organic Polymer (a-6)

Stearyl methacrylate 10 g, 60 g of methyl methacrylate, 30 g of CYCLOMER 100 (manufactured by Daicel Chemical Industries Ltd.) and 200 g of MEK were added, and the internal temperature was raised to about 60° C., in a nitrogen stream. Then, V65 was added in twice in a total amount of 1.5 g, and stirring was continued at 65° C. for 6 hours. Subsequently, the internal temperature was raised to 80° C. to completely inactivate the V65, and then the internal mixture was returned to room temperature, thereby obtaining a reaction product containing an organic polymer (a-6). The solid content was about 34%.

Synthesis Example 7

Synthesis of an Organic Polymer 7) without the Scope of the Present Invention

Perfluorooctyl methylmethacrylate 30 g, 70 g of methyl methacrylate and 200 g of MEK were added, and the internal temperature was raised to about 60° C., in a nitrogen stream. Then, V65 was added in twice in a total amount of 1.5 g, and stirring was continued at 65° C. for 6 hours. Subsequently, the internal temperature was raised to 80° C. to completely inactivate the V65, and then the internal mixture was returned to room temperature, thereby obtaining a reaction product containing an organic polymer (a-7). The solid content was about 33%.

Synthesis Example 8

Synthesis of an Organic Polymer (a-8) without the Scope of the Present Invention Perfluorooctylethyl methacrylate 10 g, 50 g of methyl methacrylate, 10 g of α,ω-dimercaptopolydimethylsiloxane, 30 g of CYCLOMER A400 (manufactured by Daicel Chemical Industries Ltd.) and 200 g of PGM were added, and the internal temperature was raised to about 60° C., in a nitrogen stream. The ratio of mercapto group to epoxy group (mol/mol) was 0.0076. Then, V65 was added in twice in a total amount of 1.5 g, and stirring was continued at 65° C. for 6 hours. During this, the viscosity of the liquid conspicuously increased to form an undissolved portion. Subsequently, the internal temperature was raised to 80° C. to completely inactivate the V65, and was then returned to room temperature. The solid content was about 34%, but a gel component and the undissolved portion during the reaction were contained. Thus, the reaction mixture was not suitable for a succeeding use.

Synthesis Example 9

Synthesis of an Organic Polymer (a-9) without the Scope of the Present Invention Perfluorooctylethyl methacrylate 15 g, 50 g of methyl methacrylate, 10 g of α,ω-dimercaptopolydimethylsiloxane, 25 g of CYCLOMER A400 (manufactured by Daicel Chemical Industries Ltd.) and 200 g of PGM were added, and the internal temperature was raised to about 60° C., in a nitrogen stream. The ratio of mercapto group to epoxy group (mol/mol) was 0.091. Then, V65 was added in twice in a total amount of 1.5 g, and stirring was continued at 65° C. for 6 hours. During this, the viscosity of the liquid conspicuously increased to cause gelation, and it was then difficult to continue stirring. Subsequently, the internal temperature was raised to 80° C. to completely inactivate the V65, and was then returned to room temperature. The solid content was about 34%, but the whole portion was in a gel state. Thus, the reaction mixture was not suitable for a succeeding use.

Synthesis Example 10

Synthesis of an Organic Polymer (a-10) without the Scope of the Present Invention Methyl methacrylate 70 g, 30 g of CYCLOMER M100 (manufactured by Daicel Chemical Industries Ltd.) and 200 g of MEK were added, and the internal temperature was raised to about 60° C., while nitrogen was flown. Then, V65 was added in twice in a total amount of 1.5 g, and stirring was continued at 65° C. for 6 hours. Subsequently, the internal temperature was raised to 80° C. to completely inactivate the V65, and the internal mixture was returned to room temperature, thereby obtaining a reaction product containing an organic polymer (a-10). The solid content was about 34%. The product had neither perfluoroalkyl group nor polysiloxane group.

Synthesis Example 11

Synthesis of an Organic Polymer (a-11) without the Scope of the Present Invention α,ω-dimercaptopolydimethylsiloxane (Number average molecular weight 1600) 0.3 g, 9.7 g of polyethylene glycol monoacrylate, 60 g of methyl methacrylate, 30 g of CYCLOMER M100 (manufactured by Daicel Chemical Industries Ltd.) and 200 g of MEK were added, and the internal temperature was raised to about 60° C., in a nitrogen stream. Then, V65 was added in twice in a total amount of 1.5 g, and stirring was continued at 65° C. for 6 hours. Subsequently, the internal temperature was to 80° C. to completely inactivate the V65, and the internal mixture was returned to room temperature, thereby obtaining a reaction product containing an organic polymer (a-11). The solid content was about 34%. This product contains no perfluoroalkyl group.

Synthesis of Fine Particles of Inorganic Oxides

Synthesis Example 12

Synthesis of Silane Coupling Agent having Multifunctional Acryl Groups by a Reaction Between a Multifunctional Acrylate Containing OH and a Silane Coupling Agent Containing NCO After 1 kg of a mixture of dipentaerythritol pentacrylate and dipentaerythritol hexaacrylate (Manufactured by Nippon Kayaku Co., Ltd., KAYAPAD DPHA), 50 g of γ-triethoxysilylpropyl isocyanate (Shin-Etsu Chemical Industries, Ltd., KBE9007), 0.2 g of dibutyl tin dilaurate and 0.5 g of hydroquinone monomethyl ether were mixed under stirring, the temperature was raised to 90° C., while air was flow, and then that temperature was kept for one hour. After it was confirmed with IR that absorption corresponding to the NCO group completely disappeared, the temperature was returned to room temperature, and the product was taken out (Silane coupling agent 1, which is shown by SC1). This reaction was quantitative.

Synthesis Example 13

Synthesis of Inorganic Oxide Fine Particles (B-1) having (met)acryloyl Groups Bonded to Their Surfaces Via —O—Si—R Bonds by a Reaction Between Colloidal Silica and a Silane Coupling Agent Having Multifunctional Acryl Groups An MEK dispersion organo silica gel (manufactured by Nissan Chemical Industries, Ltd., MEK-ST, 30% MEK solution) 400 g, 400 g of the above SC1, 0.4 g of hydroquinone monomethyl ether and 4 g of acetyl acetone aluminum were well mixed under stirring, and then 8 g of pure water was added. The mixture was continuously stirred at room temperature for at least 3 hours. Thereafter, the mixture was heated to 50 to 70° C. in the air atmosphere and continuously stirred at that temperature for at least 2 hours, and thus the silane coupling agent was reacted with the surface of the silica sol to form a protective colloid. Thereby, target inorganic oxide fine particles (B-1) were obtained.

Synthesis Example 14

Synthesis of Inorganic Oxide Fine Particles (b-2) Having Colloidal Silica, and (meth)acryloyl Groups Bonded to Their Surfaces Via —O—Si—R Bonds by a Reaction Between a Silane Terminal Polymer a Having Acryl Groups and Colloidal Silica Glycidyl methacrylate 95 g, 3 g of mercaptopropyl trimethoxysilane (manufactured by Shi-Etsu Chemical Industries, Ltd., KBM803) and 200 g of propylene glycol monomethyl ether acetate (PGMAc) were mixed, and then the internal temperature was raised to about 60° C., while nitrogen was flown. Thereafter, V65 was added in twice in the total amount of 1.5 g, and the mixture was continuously stirred at 65° C. for 6 hours. Then, after the internal temperature was raised to 100° C. to completely inactivate the V65, 1.5 g of triphenyl phosphine was added, and stirring was continued in the air atmosphere until the mixture became homogenized. Aft that, a mixture consisting of 49 g of acrylic acid and 10 g of PGMA was added in about 20 minutes, the internal pressure was raised to 110° C. and the temperature was kept under stirring for at least 8 hours, thereby completing the reaction between acrylic acid and the epoxy groups. After the internal mixture was returned to room temperature, 163 g of MEK-ST and 0.04 g of aluminum acetyl acetonate were added. After the mixture was stirred until it became homogeneous, 0.99 g of pure water was added and the mixture was reacted at room temperature for 3 hours and at 50° C. to 70° C. for about 4 hours. Then, the internal temperature was returned to room temperature. Target inorganic oxide fine particles (b-2) were obtained with the solid content of about 30%.

Synthesis 15

Inorganic Oxide Fine Particles (b-3) Having Colloidal Silica, and (meth)acryloyl Groups Bonded to Their Surfaces Via —O—Si—R— Bonds by a Reaction Between Silane Terminal Polymer Having Acryl Groups and Colloidal Silica Glycidyl methacrylate 95 g, 3 g of mercaptopropyltrimethoxysilane, (manufactured by The Shin-Etsu Chemical Co. Ltd., KBM803) and 200 g of propylene glycol monomethyl ether acetate (hereinafter abbreviated as PGMAc) were mixed, and then the internal temperature was raised to about 60° C., in a nitrogen stream. Thereafter, V65 was added in twice in a total amount of 1.5 g, and stirring was continued at 65° C. for 6 hours. Then, after the internal temperature was raised to 100° C. to completely inactivate the V65, 200 g of PGMAc and 1.5 g of triphenyl phosphine were added, and stirring was continued in the air atmosphere until the mixture became homogeneous. Thereafter, a mixture of 39 g of acrylic acid/10 g of PGMAc was added in about 20 minutes, the internal temperature was raised to 110° C., and the temperature was kept under stirring for at least 8 hours. Thereby, a reaction between acrylic acid and the epoxy groups were completed. After the internal mixture was returned to room temperature, 163 g of MEK-ST and 0.04 g of aluminum acetyl acetonate were added. After stirring was performed until the mixture became homogenous, 0.99 g of pure water was added, and a reaction was performed at room, temperature for 3 hours and at 50° C. to 70° C. for about 4 hours. Then, the internal temperature was returned to room temperature.

Thereby, target inorganic oxide fine particles (b-3) was obtained with the solid content of about 28%.

Synthesis Example 16

Inorganic Oxide Fine Particles (b-4) Having (meth)acryloyl Groups Bonded to Their Surfaces Via —Si—R— Bonds by a Reaction Between Colloidal Silica and Silane Coupling Agent Having Multifunctional Acryl Groups PGMAc dispersed organo silica sol (manufactured by Nissan Chemical Industries, Ltd., PMA-ST, 30% PGMAc dispersed liquid) 400 g, 400 g of the above SC1, 0.4 g of hydroquinone monomethyl ether and 4 g of acetyl acetone aluminum were well mixed under stirring, then 8 g of pure water was added, and stirring was continued at room temperature for at least 3 hours. Thereafter, the temperature was raised to 50 to 70° C. in the air atmosphere, stirring was continued at that temperature for at least 2 hours, and the silane coupling agent was reacted with the surface of the silica sol to form a protective. Thereby, target inorganic oxide fine particles (b-4) were obtained.

Preparation of Compositions, and Formation and Evaluation of Coated Films

Examples 1 to 5, Comparative Example 1

As shown in Table 1, 100 parts by weight of the solid component of the product obtained in Synthesis Example was added with 3 parts of IRGACURE 250 (Chiba Specialty Chemicals, Ltd., iodonium salt-type cationic photo polymerization initiator), and the mixture was adjusted to the solid content of 25% with propylene glycol monomethyl ether (PGM), thereby preparing a coating liquid. This was coated on a 100 μm thick PET film (manufactured by MITSUBISHI Chemical Polyester Film Co., Ltd., haze value 1.1%) such that a dried film thickness would be 1 μm. Then, it was dried at 80° C. to remove the solvent and form a dried film. The film was cured with use of a high pressure mercury lamp at an output density of 120 W/cm, and the transparency, the warped amount, the pensile hardness and adhesion of the film were evaluated. The composition and the evaluation results were shown in Table 2, respectively.

Note that Comparative Example 1 does not contain a ring-opening polymerizable group capable of being cation polymerized.

As clear from the results, it is recognized that the films composed of the compositions of the present invention as shown in Examples 1 to 5 have high pensile hardness (Each of them has F or more) even in the form of the cured film alone, and their hardness is more excellent than that of the antifouling agent (polymer) other than the present invention as in Comparative Example 1.

Comparative Example 2

A coated film was formed and evaluated in the same manners as in Example 1 except that no cationic photo polymerization initiator was added. The composition and evaluation results are shown in Table 1 and 2, respectively. The cured film obtained in Comparative Example 2 had lower hardness as compared with the films of the present invention.

Comparative Examples 3 and 4

Coated films were formed and evaluated in the same manners as in Example 1 except that (a-1) was replaced by (a-10) and (a-11), respectively.

The compositions and evaluation results are shown in Tables 1 and 2, respectively. The cured films obtained in Comparative Examples 3 and 4 had lower hardness and contact angles as compared with those of the films of the present invention.

Example 6

After 10 parts by weight of the solid component of (a-1), 90 parts of the solid component of (b-1), 1 part of IRGACURE 250 and 2 parts of IRGACURE 184 were adjusted to the solid content of 40% with PGM, the mixture was coated on a 125 μm thick polymethyl methacrylate (PMMA) film (manufactured by Mitsubishi Rayon Co., Ltd., haze value 0.2%) such that a dried film thickness would be 1.8 μm. Then, the film was dried at 80° C. to remove the solvent, thereby forming a dried film. This was cured by using the high pressure mercury lamp at the output density of 120 W/cm, and the resulting film was evaluated.

The composition and the evaluated results were shown in Tables 1 and 2, respectively.

Examples 7 to 16, Comparative Examples 5 and 6

A coating liquid was prepared with a composition shown in Table 1, and coated on each substrate such that a dried film thickness would be as shown in Table 1, and the coated liquid was dried, cured and evaluated in the same manners as in Example 6.

The compositions and evaluation results were shown in Tables 1 and respectively.

The cured films obtained in Comparative Examples 5 and 6 had lower hardness and transparency (haze) as compared with Examples (Examples 6, 7, 9, 17), etc. using the same compositions using the same materials as the other components (components (B), (C), (D)).

Example 17

A solid component (a-1) 10 parts by weight, 1 part of IRGACURE 250, 2 parts of IRGACURE 184, 90 parts of the solid component of (b-1), 4 parts of TINUVIN P (2-(2-hydroxy-5-methylphenyl)benzotriazole, ultraviolet absorber, manufactured by Chiba Specialty Chemicals, Co., Ltd.), 3 parts of SANOL LS765 (a mixture of bis(1,2,2,6,6-pentamethyl-4-piperidyl)sebacate and methyl(1,2,2,6,6-pentamethyl-4-piperidyl)sebacate, hindered amine type light stabilizer, manufactured by Sankyo Co., Ltd.) were adjusted to the solid content of 40% with PGM, and the mixture was coated on a 125 μm thick PMMA film (manufactured by Mitsubishi Rayon Co., Ltd., haze value 0.2%) such that a dried film thickness would be 1 μm. Then, the film was dried at 80° C. to remove the solvent and form a dried film. This was cured by using the high pressure mercury lamp at the output density of 120 W/cm, and the resulting film was evaluated.

The composition and the evaluated results were shown in Tables 1 and 2, respectively.

With respect to the film, an antifouling property evaluated according to a method based on the test for stain-resistant materials for civil engineering use, type I (A composition of a testing liquid was changed to 95% of water and 5% of carbon black). As a result, brightness different ΔL* was −0.0, showing an excellent antifouling property. The smaller the ΔL* value is, the fouler the film is. Ordinarily, it is considered that the ΔL* of at least −7.00 meets the performance standard of the test. In addition, even after the film was subjected to an accelerated weathering test with an ultraviolet fluorescent lamp (QUV) for 500 hours, the ΔL* was −0.1 with excellent antifouling property being maintained. Accordingly, it could be confirmed that the film had excellent durability of the antifouling property.

Comparative Example 7

After UV9300 (epoxy group side chain-containing silicone, manufactured by GE-Toshiba Silicone Co., Ltd.) was diluted to a concentration of 20% with toluene, a coated film was prepared in the same manner as in Example 1, except that a coating liquid was prepared by adding IRGACURE 250 to the UV9300 liquid at a ratio of 3 parts of the former to 100 parts of the solid component of the latter.

Results of Comparative Example 7 were shown in Table 2. The hardness was poor.

TABLE 1

| | Component (A) | Component (B) | Component (C) | Component (D) | A/B/C/D (weight ratio) | Component (I)/(J) | Concentration of coating liquid (weight) | Substrate | Dried film thickness (μm) |
|---|---|---|---|---|---|---|---|---|---|
| Example 1 | a-1 | — | I250 | — | 100/0/3/0 | — | 25 | PET | 1 |
| Example 2 | a-2 | — | I250 | — | 100/0/3/0 | — | 25 | PET | 1 |
| Example 3 | a-4 | — | I250 | — | 100/0/3/0 | — | 25 | PET | 1 |
| Example 4 | a-5 | — | I250 | — | 100/0/3/0 | — | 25 | PET | 1 |
| Example 5 | a-1/a-6 | — | I250 | — | (1/99)/0/3/0 | — | 25 | PET | 1 |
| Comparative Example 1 | a-7 | — | I250 | — | 100/0/3/0 | — | 25 | PET | 1 |
| Comparative Example 2 | a-1 | — | — | — | 100/0/0/0 | — | 25 | PET | 1 |
| Comparative Example 3 | a-10 | — | I250 | — | 100/0/3/0 | — | 25 | PET | 1 |
| Comparative Example 4 | a-11 | — | I250 | — | 100/0/3/0 | — | 25 | PET | 1 |
| Example 6 | a-1 | b-1 | I250 | I184 | 10/90/1/2 | — | 40 | PMMA | 1.8 |
| Example 7 | a-1 | b-2 | I250 | I184 | 10/90/2/3 | — | 40 | PET | 1.8 |
| Example 8 | a-1 | b-3 | I250 | I184 | 10/90/1/4 | — | 40 | PET | 1.8 |
| Example 9 | a-1 | b-1 | I250 | I184 | 10/90/1/2 | — | 40 | PET | 1.8 |
| Example 10 | a-1 | b-1 | I250 | I184/OXE01 | 10/90/1/(2/1) | — | 40 | PMMA | 1.8 |
| Example 11 | a-1 | b-1/b-2 | I250 | I184/OXE01 | 10/(60/30)/1/(3/1) | — | 40 | PET | 5 |
| Example 12 | a-4 | b-3 | I250 | I907 | 10/90/1/2 | — | 40 | PET | 1.8 |
| Example 13 | a-4 | b-1 | I250 | I907 | 10/90/1/2 | — | 40 | PMMA | 1.8 |
| Example 14 | a-4 | b-2 | I250 | I184/OXE01 | 10/90/1/(1/2) | — | 40 | PET | 1.8 |
| Example 15 | a-4 | b-3 | I250 | OXE01 | 10/90/1/2 | — | 40 | PC | 1.8 |

TABLE 1-continued

| | Component (A) | Component (B) | Component (C) | Component (D) | A/B/C/D (weight ratio) | Component (I)/(J) | Concentration of coating liquid (weight) | Substrate | Dried film thickness (μm) |
|---|---|---|---|---|---|---|---|---|---|
| Example 16 | a-1/a-6 | b-1/b-2 | I250 | I184/OXE01 | (1/99)/(60/30)/1/(3/1) | — | 40 | PET | 5 |
| Example 17 | a-1 | b-1 | I250 | I184 | 10/90/1/2 | TP/LS765 (4/3) | 40 | PMMA | 1 |
| Comparative Example 5 | a-7 | b-1 | I250 | I184 | 10/90/1/2 | — | 40 | PET | 1.8 |
| Comparative Example 6 | a-7 | b-2 | I250 | I184 | 10/90/1/2 | — | 40 | PET | 1.8 |

Signs in Table 1 are as follows.
I250 (IRGACURE 250): Iodonium salt-type cationic photo polymerization initiator, manufactured by Chiba Specialty Chemicals Co., Ltd.
I184 (IRGACURE 184): Radical photo polymerization initiator, manufactured by Chiba Specialty Chemicals Co., Ltd.
1907 (IRGACURE 907): Radical photo polymerization initiator, manufactured by Chiba Specialty Chemicals Co., Ltd.
OXE01 (IRGACURE OXE01): Radical photo polymerization initiator manufactured by Chiba Specialty Chemicals Co., Ltd,
TP (TINUVIN P): Ultraviolet absorber, manufactured by Chiba Specialty Chemicals Co., Ltd.
LS765 (SANOL LS765): Hindered amine-type stabilizer, manufactured by Sakyo Co., Ltd.
PET: Polyethylene terephthalate film, manufactured by Mitsubishi Chemical Polyester Film, Co., Ltd., T600EU07, thickness 100 μm (haze 1.1%)
PC: Polycarbonate film, LEXAN film manufactured by General Electric Company, thickness 500 μm (Haze 0.2%)
PMMA: Polymethyl methacrylate film, manufactured by Mitsubishi Rayon Co., Ltd., thickness 125 μm (haze: 0.2%)

TABLE 2

| | Haze(%) | Pencil hardness | Contact angle (water/degree) | Contact angle (hexadecan/degree) | Adhesion |
|---|---|---|---|---|---|
| Example 1 | 1.0 | H | 111 | 53 | ○ |
| Example 2 | 1.1 | F | 109 | 46 | ○ |
| Example 3 | 1.1 | 2H | 111 | 43 | ○ |
| Example 4 | 1.1 | H | 110 | 62 | ○ |
| Example 5 | 1.1 | F | 94 | 9 | ○ |
| Comparative Example 1 | 1.1 | 5B | 108 | 66 | ○ |
| Comparative Example 2 | 1.1 | 2B | 104 | 62 | ○ |
| Comparative Example 3 | 1.1 | F | 71 | 4 | ○ |
| Comparative Example 4 | 1.1 | H | 78 | 22 | ○ |
| Comparative Example 7 | 1.1 | B | 108 | 37 | ○ |
| Example 6 | 1.0 | 2H | 111 | 52 | ○ |
| Example 7 | 1.1 | 2H | 110 | 52 | ○ |
| Example 8 | 0.4 | H | 110 | 55 | ○ |
| Example 9 | 1.0 | 2H | 110 | 51 | ○ |
| Example 10 | 0.3 | H | 110 | 53 | ○ |
| Example 11 | 1.0 | 3H | 110 | 52 | ○ |
| Example 12 | 1.1 | 2H | 111 | 44 | ○ |
| Example 13 | 0.4 | H | 109 | 45 | ○ |
| Example 14 | 1.1 | 2H | 109 | 45 | ○ |
| Example 15 | 0.3 | H | 109 | 44 | ○ |
| Example 16 | 1.0 | 3H | 93 | 9 | ○ |
| Example 17 | 0.6 | F | 110 | 43 | ○ |
| Comparative Exampe 5 | 1.1 | H | 104 | 63 | ○ |
| Comparative Example 6 | 1.1 | H | 110 | 61 | ○ |

Next, with respect to the films obtained by the above Examples 1 to 17 and Comparative Examples 1 to 7, the durability of the antifouling property (fingerprint resistance) was evaluated. Specifically, the fingerprint wiping-off property (1-1), the fingerprint wiping-off property (1-50), the fingerprint wiping-off property (2), the fingerprint wiping-off durability and the wiping-off feeling were evaluated. Results are shown in Table 3.

With respect to the films in Examples 1 to 17, the attached fingerprint could be substantially wiped off by reciprocating a tissue paper 1 to 2 times. It was confirmed that the films had excellent fingerprint wiping-off property. Even after the film was reciprocatedly rubbed with a rubber eraser 100 times and then the fingerprint was attached and wiped off, the original wiping-off feeling (Slipping exists on wiping off, and the fingerprint is wiped off merely by slightly rubbing) was not damaged and the durability was excellent.

On the other hand, the films of Comparative Examples 1 to 7 were inferior in both the fingerprint wiping-off property (1-1) and the fingerprint wiping-off property (1-50). In most of the films, the attached fingerprint needed to be wiped off by reciprocating a tissue paper several times or more. From the viewpoint that the fingerprint wiping-off property (1-50) was greater than the fingerprint wiping-off property (1-1), it was found that the films were inferior in the fingerprint wiping-off durability.

Further, F/C (a ratio of fluoride carbon) of the film in Example 1 was measured by ESCA (Shimadzu Corporation ESCA1000). As a result, while the average composition of the film had F/C=0.064, the composition at a position of 3 nm depth from the surface of the film was F/C=0243. That is, the content of the antifouling groups (perfluoroalkyl group) at the position of 3 nm depth from the film surface was 3.8 times the average content of the antifouling groups in the whole of the above film. It was seen that the antifouling group existed at the higher concentration over the surface of the film.

From this result, even if the amount of the antifouling group is 1 weight percent, for example, it was recognized that high antifouling property could be realized, because the antifouling groups are effectively concentrated in the surface of the film.

acrylate oligomer, a reaction product was used, which was produced by reacting hydroxyethyl acrylate with the isocyanate-terminated oligomer, which was obtained by adding isophorone diisocyanate to a polytetramethylene glycol having the average molecular weight of 800. As an isocyanuric acid modified triacrylate, ARONIX M313 manufactured by Toagosei Co., Ltd. was used.

Composition of Radical Polymerizable, Active Energy Ray Curable Material for Optical Transparent Protective Layer Urethane acrylate oligomer 60 parts by weight
Isocyanuric acid modified triacrylate 20 parts by weight

TABLE 3

| | Fingerprint wiping-off property (1-1) | Fingerprint wiping-off property (1-50) | Fingerprint wiping-off property (2) | Fingerprint wiping-off durability | Wiping feeling |
|---|---|---|---|---|---|
| Example 1 | 1 | 1 | 1.5 | ○ | ○ |
| Example 2 | 1.5 | 1.5 | 1.5 | ○ | ○ |
| Example 3 | 1.5 | 1.5 | 1.5 | ○ | ○ |
| Example 4 | 1 | 1 | 1.5 | ○ | ○ |
| Example 5 | 1 | 1 | 1.5 | ○ | ○ |
| Example 6 | 1.5 | 1.5 | 1.5 | ○ | ○ |
| Example 7 | 2 | 2 | 2 | ○ | ○ |
| Example 8 | 2 | 2 | 2 | ○ | ○ |
| Example 9 | 2 | 2 | 2 | ○ | ○ |
| Example 10 | 2 | 2 | 2 | ○ | ○ |
| Example 11 | 1.5 | 1.5 | 1.5 | ○ | ○ |
| Example 12 | 2 | 2 | 2 | ○ | ○ |
| Example 13 | 2 | 2 | 2 | ○ | ○ |
| Example 14 | 2 | 2 | 2 | ○ | ○ |
| Example 15 | 2 | 2 | 2 | ○ | ○ |
| Example 16 | 1.5 | 1.5 | 1.5 | ○ | ○ |
| Example 17 | 2 | 2 | 2 | ○ | ○ |
| Comparative Example 1 | 6 | 8 | 10 | x | Δ |
| Comparative Example 2 | 2.5 | 5 | 6 | x | Δ |
| Comparative Example 3 | 8 | 10 | 10 | x | x |
| Comparative Example 4 | 5 | 6 | 6 | x | ○ |
| Comparative Example 5 | 4 | 7 | 6 | x | Δ |
| Comparative Example 6 | 4 | 6 | 6 | x | Δ |
| Comparative Example 7 | 4 | 7 | 8 | x | ○ |

Examples 18 to 21 and Comparative Examples 8 to 11

An optical recording medium for BLU-RAY DISC™ was prepared, which had a reflective layer, a second dielectric layer, a recording layer and a first dielectric layer formed on a groove-provided surface of a disc-shaped supporting substrate (made of polycarbonate, thickness 1.1 mm, diameter 120 mm) which was formed with grooves for recording information.

A radical polymerizable, active energy rays-curable material of the following composition was coated onto the surface of the first dielectric layer by spin coating, and thereafter ultraviolet ray was irradiated at an accumulated light amount of 1000 mJ/cm² by using the high pressure mercury lamp of the output density of 120 W/cm, thereby forming an optical transparent layer which had a thickness of 98 μm after curing. The pensile hardness of this surface was 4B. As an urethane Tetrahydrofurfuryl acrylate 20 parts by weight
IRUGACURE 184 3 parts by weight Next, the coating compositions shown in Table 4 were prepared. X-22-164A, X-22-164B, KF-412 and KF945A which were used in Comparative Examples 8 to 11 in place of the organic polymers of the present invention are materials heretofore all proposed as antifouling agents for the hard coat agents of the optical discs (X-22-164A and X-22-164B: both polydimethylsiloxane, manufactured by Shin-Etsu Chemical Co., Ltd. and having methacryloyl groups at both terminals; KF-412: alkyl-modified silicone, manufactured by Shin-Etsu Chemical Co., Ltd.; and KF945A: Ether-modified silicone, manufactured by Shin-Etsu Chemical Co., Ltd.).

This composition was coated in form of a film onto an optical transparent layer of an optical recording medium by the spin coating method, a dried film was prepared by drying the coated film and removing the solvent at 80° C., a hard coat layer having the cured film thickness of 2.5 μm was formed by irradiating the dried film with ultraviolet ray at an accumulated light amount of 2000 mJ/cm² by using the high pressure mercury lamp having the output density of 120 W/cm. With respect to the hard coat layers, transparency (visual evaluation), pensile hardness, contact angles (water, hexadecane), adhesion, antifouling property (artificial fingerprint liquid attachment resistance, artificial fingerprint wiping-off resistance (1-1), artificial fingerprint wiping-off durability), and slipping property were evaluated. Results are shown in Table 5.

Since the hard coat layers produced by using the compositions within the scope of the present invention (Examples 18 to 21) have high contact angles, they had excellent adhesion resistance in the antifouling property, and high coefficient of friction, that is, not high slipping property. As a result, the films according to the present invention favorably had excellent wiping-property and wiping-off durability.

On the other hand, the hard coat layers produced by using the compositions outside the scope of the present invention (Comparative Examples 8 to 11) had low contact angles to hexadecane, poorer attachment resistance in the antifouling property or too high slipping property. Therefore, the stain of the fingerprint was likely to be spread on wiping off. As a result, the films had poorer wiping-off property and wiping-off durability.

TABLE 4

|  | Component (A) or other polymer | Component (Bi) | Component (Bii) | Component (C) | Component (D) | (A) or polymer/ Bi/Bii/C/D | Concentration of coating liquid (weight) |
|---|---|---|---|---|---|---|---|
| Example 18 | a-3 | b-4 | — | — | I184 | 5/95/0/0/2 | 30 |
| Example 19 | a-3 | b-4 | DPHA | — | I184 | 5/45/50/0/2 | 30 |
| Example 20 | a-2 | b-4 | — | I250 | I184 | 5/95/0/2/2 | 30 |
| Example 21 | a-3 | — | DPHA | — | I184 | 5/0/95/0/2 | 30 |
| Comparative Example 8 | X-22-164A | b-4 | — | — | I184 | 0.3/100/0/0/2 | 30 |
| Comparative Example 9 | X-22-164B | b-4 | — | — | I184 | 3/97/0/0/2 | 30 |
| Comparative Example 10 | KF-412 | b-4 | — | — | I184 | 3/97/0/0/2 | 30 |
| Comparative Example 11 | KF945A | b-4 | — | — | I184 | 3/97/0/0/2 | 30 |

Signs in Table 4 are as follows.
X-22-164A: manufactured by Shin-Etsu Chemical Co., Ltd., polydimethylsiloxane having methacryloyl groups at both terminals and having metacryloyl groups at both terminals
X-22-164B: manufactured by Shin-Etsu Chemical Co., Ltd., polydimethylsiloxane having methacryloyl groups at both terminals
KF-412: manufactured by Shin-Etsu Chemical Co., Ltd., alkyl-modified silicone
KF945A: manufactured by Shin-Etsu Chemical Co., Ltd., ether-modified silicone
DPHA: dipentaerythritol hexaacrylate

TABLE 5

|  | Transparency | Pencile hardness | Contact angle (water/ degree) | Contact angle (hexadecane/ degree) | Adhesion | Artificial fingerprint liquid attachment resistance | Artificial fingerprint liquid wiping-off property | Artificial fingerprint liquid wiping-off durability | Slipping property (coefficient of kinetic friction) |
|---|---|---|---|---|---|---|---|---|---|
| Example 18 | ○ | F | 109 | 47 | ○ | L4 | 2 | ○ | >1.0 |
| Example 19 | ○ | F | 108 | 49 | ○ | L4 | 2 | ○ | >1.0 |
| Example 20 | ○ | F | 108 | 50 | ○ | L4 | 2 | ○ | >1.0 |
| Example 21 | ○ | F | 109 | 51 | ○ | L4 | 2 | ○ | >1.0 |
| Comparative Example 8 | ○ | F | 102 | 38 | ○ | L4 | 3.5 | x | 0.8 |
| Comparative Example 9 | Δ | F | 106 | 33 | ○ | L3 | 4 | x | 0.3 |
| Comparative Example 10 | Δ | F | 105 | 33 | ○ | L3 | 4 | x | 0.1 |
| Comparative Example 11 | Δ | F | 106 | 34 | ○ | L3 | 6 | x | 0.5 |

Reference Examples 1 to 3

With respect to commercially available optical discs having antifouling hard coat films on their surfaces, DVD-R120HC (DVD manifested by TDK Corporation), BD-RE135N (BLU-RAY DISC™ manufactured by TDK Corporation), and DVD-R HG (manufactured by Hitachi Maxell Ltd.) as Reference Examples 1 to 3, contact angles and antifouling properties were evaluated as Reference Examples 1 to 3. Results are shown in Table 6. The contact angles to hexadecane were low, and although the artificial fingerprint liquid attachment resistance was excellent, the wiping-off property exceeded 3 reciprocation movements and the wiping-off durability was low, too.

TABLE 6

|  | Contact angle (water/degree) | Contact angle (hexadecane/degree) | Artificial fingerprint liquid attachment resistance | Artificial finterprint wiping-off property | Artificial fingerprint wiping-off durability |
|---|---|---|---|---|---|
| Reference Example 1 | 96 | 44 | L 4 | 3.5 | x |
| Reference Example 2 | 101 | 41 | L 4 | 4 | x |
| Reference Example 3 | 100 | 37 | L 4 | 3.5 | x |

The invention claimed is:

1. An organic polymer, having a structure of a radical polymerizable copolymer obtained from a mixture comprising 5 to 30 weight percent of a first radical polymerizable monomer having a perfluoroalkyl group, 0.01 to 5 weight percent of α,ω-dimercaptopolysiloxane, 5 to 40 weight percent of a second radical polymerizable monomer having a cationic photo polymerizable epoxy group, and 25 to 75 weight percent of a third radical polymerizable monomer different from and copolymerizable with the first and second radical polymerizable monomers and the α,ω-dimercaptopolysiloxane, in which the molar ratio of the mercapto groups to the epoxy groups is 0.0001 to 0.025; and/or a structure obtained by reacting the epoxy groups of the radical polymerizable copolymer with (meth)acrylic acid.

2. The organic polymer according to claim 1, wherein the α,ω-dimercaptopolysiloxane is α,ω-dimercaptopolydimethylsiloxane.

3. A composition comprising the organic polymer according to claim 1, and further comprising a cationic photo polymerization initiator and/or a radical photopolymerization initiator.

4. The composition according to claim 3, further comprising an organic-inorganic composite having fine particles of an inorganic oxide consisting essentially of a colloidal silica, and (meth)acryloyl groups bonded to the inorganic oxide fine particles via a —O—Si—R-bond, wherein R represents a linear or branched alkylene group having 2 to 10 carbon atoms, and/or a polyfunctional (meth)acrylate having at least three (meth)acryloyl groups in one molecule.

5. The composition according to claim 3, further comprising at least one compound and/or polymer selected from the group consisting of a radical polymerizable organic (meth)acrylate compound, radical polymerizable organic (meth)acrylamide, a polymer having a radical polymerizable group, an organic epoxy compound and an organic oxetane compound.

6. The composition according to claim 3, further comprising at least one additive selected from the group consisting of an ultraviolet absorber, a hindered amine light stabilizer, an antistatic agent, a slipping agent, an anti-clouding agent and a releasing agent.

7. The composition according to claim 3, further comprising an organic polymer having a structure of a copolymer obtained from a mixture comprising a (meth)acrylate having a liner alkyl group having at least 12carbon atoms and a (meth)acrylate having a cationic photo polymerizable epoxy group and/or a structure obtained by reacting (meth)acrylic acid with the epoxy groups of the copolymer.

8. The composition according to claim 3, wherein when a coated film thickness of 5 μm is formed by applying the composition onto an adhesive polyethylene terephthalate substrate having a thickness of 100 μm, and polymerizing it by irradiation with active energy rays, the coated film has a pencil hardness of HB or more and a contact angle to water of at least 80 degrees.

9. The composition according to claim 3, wherein when a coated film thickness of 5μm is formed by applying the composition onto an adhesive polyethylene terephthalate substrate having a thickness of 100 μm, and polymerizing it by irradiation with active energy rays, the coated film has a pencil hardness of HB or more, a contact angle to water of at least 90 degrees, and a contact angle to hexadecane of at most 20degrees.

10. The composition according to claim 3, wherein when a coated film thickness of 5μm is formed by applying the composition onto an adhesive polyethylene terephthalate substrate having a thickness of 100 μm, and polymerizing it by irradiation with active energy rays, the coated film comprises one or more antifouling groups at a position of a depth of 3 nm from the surface of the coated film in an amount at least three times of an average amount of the antifouling groups of the whole film.

11. The composition according to claim 3, wherein when a coated film thickness of 5 μm is formed by applying the composition onto an adhesive polyethylene terephthalate substrate having a thickness of 100 μm, and polymerizing it by irradiation with active energy rays, the coated film exhibits an abrasion resistance of at most 25.0 and a warped amount of at most 1 mm after being cured in an atmosphere with an ordinary oxygen concentration.

12. The composition according to claim 3, wherein when a coated film thickness of 5 μm is formed by applying the composition onto an adhesive polyethylene terephthalate substrate having a thickness of 100 μm, and polymerizing it by irradiation with active energy rays, the coated film has a haze value of at most 1.5%.

13. An antifouling agent, comprising the composition according to claim 3.

14. A cured article obtained by polymerizing the composition according to claim 3 by irradiation with active energy rays.

15. An article having a coated film on a surface thereof, said film being obtained by polymerizing the composition according to claim 3 by irradiation with active energy rays.

16. An optical recording medium or a laminate for an optical display comprising the article according to claim 15.

17. An optical recording medium having a multilayer film comprising at least a recording layer or a reflecting layer deposited on a substrate, and a cured film obtained by polymerizing the composition according to claim 3 by irradiation with active energy rays, wherein the cured film is provided on an outermost surface at a radiation incident side of the optical recording medium.

18. The optical recording medium according to claim 17, wherein the cured film is provided on the outermost surface of the optical recording medium on an opposite side of the substrate from the recording layer or the reflecting layer.

19. The optical recording medium according to claim 18, further comprising a transparent layer between the multilayer film and the cured film.

20. The optical recording medium according to claim 19, wherein the transparent layer comprises fine particles of an inorganic oxide and/or a urethaneacrylate.

21. A laminate for an optical display comprising a transparent resin substrate, and a cured film obtained by polymerizing the composition according to claim 3 by irradiation with an active energy ray, wherein the cured film is provided on at least one outermost surface of the laminate for an optical display.

* * * * *